(12) United States Patent
Mizutani

(10) Patent No.: US 9,858,168 B2
(45) Date of Patent: *Jan. 2, 2018

(54) METHOD FOR ESTIMATING FORMAT OF LOG MESSAGE AND COMPUTER AND COMPUTER PROGRAM THEREFOR

(71) Applicant: International Business Machines Corporation, Armonk, NY (US)

(72) Inventor: Masayoshi Mizutani, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/349,033

(22) Filed: Nov. 11, 2016

(65) Prior Publication Data

US 2017/0060724 A1 Mar. 2, 2017

Related U.S. Application Data

(63) Continuation of application No. 14/837,234, filed on Aug. 27, 2015.

(30) Foreign Application Priority Data

Aug. 28, 2014 (JP) ................................. 2014-173696

(51) Int. Cl.
*G06F 17/30* (2006.01)
*G06F 11/34* (2006.01)
*G06N 5/04* (2006.01)

(52) U.S. Cl.
CPC .... *G06F 11/3476* (2013.01); *G06F 17/30958* (2013.01); *G06N 5/04* (2013.01); *G06N 5/048* (2013.01)

(58) Field of Classification Search
CPC . G06F 11/3476; G06F 17/30958; G06N 5/04; G06N 5/048
See application file for complete search history.

(56) References Cited

U.S. PATENT DOCUMENTS 3,298,000 A * 1/1967 Sanders ................... G06F 17/15
6,216,173 B1 * 4/2001 Jones ..................... G06F 9/4812
709/202

(Continued)

FOREIGN PATENT DOCUMENTS

JP 10293704 A 11/1998
JP 2001101049 A 4/2001

(Continued)

OTHER PUBLICATIONS

Daisuke, "The Structure Learning by Dual Decomposition," Preferred Research, Nov. 26, 2010, p. 1-5, https://research.preferred.jp/2010/11/dual-decomposition/, Accessed on Aug. 26, 2015.

(Continued)

*Primary Examiner* — Noosha Arjomandi
(74) *Attorney, Agent, or Firm* — Scott S. Dobson

(57) ABSTRACT

A technique for estimating a format of a log message (LM) according to the present invention includes creating a first directed graph structure by dividing a first LM by predetermined characters to define divided portions as nodes and arranging the nodes in order from the beginning of the first LM; creating a second directed graph structure by performing on a second LM the same processing as that performed on the first LM; comparing nodes in the first directed graph structure with nodes in the second directed graph structure to detect nodes other than nodes including a corresponding character string; adding to the first directed graph structure the node detected in the second directed graph structure among the detected nodes as a first branch node; and (Continued)

estimating the format, based on the first directed graph structure including the first branch node added thereto.

18 Claims, 18 Drawing Sheets

(56) References Cited

U.S. PATENT DOCUMENTS

| | | | |
|---|---|---|---|
| 6,519,248 B1* | 2/2003 | Valko | H04L 69/161 370/352 |
| 9,146,962 B1* | 9/2015 | Boe | G06F 9/542 |
| 9,210,056 B1* | 12/2015 | Choudhary | G06F 17/30864 |
| 9,479,567 B1* | 10/2016 | Koorapati | G06F 17/30067 |
| 2002/0174093 A1* | 11/2002 | Casati | G07C 5/002 |
| 2005/0027712 A1* | 2/2005 | Gargi | G06F 17/30274 |
| 2011/0131156 A1 | 6/2011 | Fisher et al. | |
| 2012/0134284 A1* | 5/2012 | Dahlman | H04W 16/28 370/252 |
| 2014/0022951 A1* | 1/2014 | Lemieux | H04W 40/20 370/255 |
| 2014/0321448 A1* | 10/2014 | Backholm | H04L 43/10 370/338 |
| 2014/0324865 A1 | 10/2014 | Mizutani | |
| 2016/0036599 A1* | 2/2016 | Hellkvist | H04L 12/185 370/390 |
| 2016/0063388 A1 | 3/2016 | Mizutani | |
| 2016/0103883 A1* | 4/2016 | Ramani | G06F 17/30525 707/725 |
| 2016/0104091 A1* | 4/2016 | Fletcher | H04L 41/5009 705/7.39 |
| 2016/0248795 A1* | 8/2016 | Chien | H04L 63/1458 |
| 2016/0292179 A1* | 10/2016 | von Muhlen | G06F 17/30165 |
| 2016/0314153 A1* | 10/2016 | Murata | G06F 12/00 |
| 2016/0352696 A1* | 12/2016 | Essigmann | H04L 63/0414 |
| 2017/0004433 A1* | 1/2017 | Raghavan | H04L 41/5009 |
| 2017/0019487 A1* | 1/2017 | Maheshwari | H04L 67/16 |
| 2017/0124170 A1* | 5/2017 | Koorapati | G06F 17/30575 |

FOREIGN PATENT DOCUMENTS

| | | |
|---|---|---|
| JP | 2005266919 A | 9/2005 |
| JP | 2007249694 A | 9/2007 |
| JP | 2009527839 A | 7/2009 |
| JP | 2011527052 A | 10/2011 |
| JP | 2013214148 A | 10/2013 |
| JP | 2016048506 A | 4/2016 |

OTHER PUBLICATIONS

Echizen, "None of CRF can be seen in 30 minutes," EchizenBlog-Zwei, Dec. 6, 2011, http://d.hatena.ne.jp/echizen_tm/20111206/1323180144, 8 pages, Accessed on Aug. 26, 2015.

Fisher et al., "Incremental Learning of System Log Formats," ACM SIGOPS Operating Systems Review, Jan. 2010, p. 1-6, vol. 44, Issue 1.

Human Interfaces Group, "Visualization: From Data to Discovery," A One Day Symposium on the Emerging Science of Big Data Visualization, May 23, 2013, p. 1-6, http://www.hi.jpl.nasa.gov/datavis/2013/, Accessed on Aug. 26, 2015.

Makanju et al., "Clustering Event Logs Using Iterative Partitioning," KDD'09, Jun. 28-Jul. 1, 2009, p. 1255-1263, ACM, Paris, France.

Mizutani, "Method for Estimating Format of Log Message and Computer and Computer Program Therefor," English Translation Application and Drawings, Filed on Aug. 28, 2014, p. 1-102, Japan Patent Application No. 2014-173696.

Software Engineering Labratory, "Analysis of the Coding Pattern," Osaka University Department of Computer Science, p. 1-4, http://sel.ist.osaka-u.ac.jp/research.codingpattern/index.html.ja, Accessed on Aug. 26, 2015.

Tang et al., "LogSig: Generating System Events from Raw Textual Logs," CIKM'11, Oct. 24-28, 2011, 10 Pages, ACM, Glasgow, Scotland, UK.

Toshihiro, "Frequent Pattern Mining," Kamishima Publication Archive, p. 1-62, http://www.kamishima.net/archive/freqpat.pdf, Accessed on Aug. 26, 2015.

Uchiumi, "CRF and Feature Templates," uchumik, Jun. 24, 2011, p. 1-50.

Vaarandi, "A Breadth-First Algorithm for Mining Frequent Patterns from Event Logs," Intelligence in Communication Systems, 2004, p. 293-308, LNCS 3283, Springer-Verlag Berlin Heidelberg.

Wikipedia, "Conditional Random Field," Wikipedia: the Free Encyclopedia, Last Modified on Jun. 17, 2015, p. 1-5, https://en.wikipedia.org/wiki/Conditional_random_field, Accessed on Aug. 26, 2015.

Wikipedia, "Memoization," Wikipedia: the Free Encyclopedia, Last Modified on Aug. 19, 2015, p. 1-9, https://en.wikipedia.org/wiki/Memoization, Accessed on Aug. 26, 2015.

List of IBM Patents or Patent Applications Treated as Related, dated Nov. 8, 2016, pp. 1-2.

* cited by examiner

METHOD FOR ESTIMATING FORMAT OF LOG MESSAGE AND COMPUTER AND COMPUTER PROGRAM THEREFOR

FIELD OF INVENTION

The present invention relates to a technique for estimating the format of a log message.

BACKGROUND

Computer systems are not necessarily immune to problems or troubles. These problems or troubles are caused by various reasons including, for example, troubles with hardware, troubles with local networks, troubles with the Internet, software bugs, and data corruption.

To enable analysis of causes of the problems or troubles that have occurred, for example, measures to generate log messages (for example, system logs, operating system logs, or application logs) at various levels of an operating system, middleware, or an application program are taken.

In general, log messages have the following properties:
in accordance with a format defined in advance inside software, or the like, a message to be output is included;
one message is a sequence formed of signs including characters;
a message is not necessarily readable by human beings, but needs to be decomposable into meaningful particles; and
a readable character string is divided by predetermined characters, such as blank characters (may be one-byte or two-byte spaces) or signs (for example, special signs).

When a trouble occurs in the system, a large number of log messages having the above properties are generated. In such a case, to understand the situation from the log messages and to solve a problem promptly, it is necessary to rapidly identify a cause.

However, although log messages are mechanically generated, most of them are not structured data. Therefore, a large amount of manpower and high cost are required in advance to make the log messages mechanically handled.

Human-readability is taken into consideration for log messages. As a technique for recognizing a meaning from a generated character string, a natural language analytical approach, such as text mining, has been known. Therefore, the natural language analytical approach is applied to log messages. However, log messages do not necessarily conform to a natural language sentence structure, and have a particular tendency that the length of one sentence is shorter than normal sentences. Therefore, it is necessary to apply an approach different from the above natural language analytical approach, instead of simply applying the natural language analytical approach, to log messages.

Furthermore, it is said that more than half of operations performed by data scientists are data integration, data cleansing, and data conversion.

Patent Literature 1 (Japanese Patent Application Publication No. 2005-266919) describes features that a log message is, as illustrated in FIG. 4, a record of the use status of a system and data communication and includes the dates and times at which an operation and data transmission/reception were performed, the contents of the performed operation, the contents of the transmitted/received data, and the like, log messages are often difficult for users to decipher, and it is often difficult to determine a message generation condition and future measures to be taken (paragraph 0039), a feature that it may be difficult to appropriately find an important message since a system log or the like with a long operation time may have thousands of rows (paragraph 0040), and features that the contents of logs can be easily determined by using different colors in such a manner that messages that may be ignored are represented in light blue and important messages, such as the shortage of a log recording area (file system full), temperature abnormality, and an SCSI error, are represented in orange, a system log and the like are displayed in an html format, and measures therefor are hyper-linked (paragraph 0041).

Patent Literature 2 (Japanese Patent Application Publication No. 10-293704) describes a feature that normalized log data in which values of data items defined by extracting a value corresponding to a predefined data item from log data in a log file to be monitored are arranged is created and accumulated (Claim 1).

SUMMARY

The present invention provides a technique for estimating the format of a log message, in particular, a technique for estimating the format of a log message held in a program or described in a program. This technique includes a method for estimating the format of a log message, a computer for estimating the format of a log message, and a computer program and computer program product therefor.

The technique according to the present invention is characterized in that by considering a plurality of log messages as one directed graph structure, the format of a log message is estimated from the directed graph structure.

According to a first aspect of the present invention, a method for use in a computer to estimate a format of a log message, includes:

a creating step of creating a first directed graph structure by dividing a first log message by predetermined characters to define divided portions as nodes and arranging the nodes in order from the beginning of the first log message;

a creating step of creating a second directed graph structure by dividing a second log message by the predetermined characters to define divided portions as nodes and arranging the nodes in order from the beginning of the second log message;

a detecting step of comparing nodes in the first directed graph structure with nodes in the second directed graph structure to detect a node in the first directed graph structure and a node in the second directed graph structure that are nodes other than nodes including a corresponding character string;

an adding step of adding to the first directed graph structure the node detected in the second directed graph structure among the detected nodes as a first branch node; and an estimating step of estimating the format, based on the first directed graph structure including the first branch node added thereto, wherein the format includes a first portion associated with a node including a corresponding character string, a second portion associated with a node whose appearance tendency of character string is similar between the node detected in the first directed graph structure and the node detected in the second directed graph structure, and, optionally, a third portion associated with a node other than nodes having a similar appearance tendency of character string.

According to an embodiment of the present invention, the method further includes:

a repeating step of repeating the creating step of creating the second directed graph structure, the detecting step, and the adding step.

According to an embodiment of the present invention, the estimating step is performed based on the directed graph structure created in the adding step performed after the repeating step is performed a predetermined number of times.

According to an embodiment of the present invention, the method further includes:

an integrating step of integrating the nodes having similar appearance tendencies of character strings into one node in the first directed graph structure including the first branch node added thereto, and the estimating step is performed based on the first directed graph structure in which the nodes having similar appearance tendencies of character strings are integrated into one node.

According to an embodiment of the present invention, a determination that the appearance tendencies of character strings are similar to each other may be performed on the basis of:

a first condition that a percentage of character strings having similar character types is equal to or more than a predetermined value, a second condition that a character length is equal to or more than a predetermined value, a third condition that an editing distance between characters is short, or a fourth condition that at least two of the first to third conditions are satisfied.

According to an embodiment of the present invention, the method further includes:

a repeating step of repeating the creating step of creating the second directed graph structure, the detecting step, the adding step, and the integrating step.

According to an embodiment of the present invention, the estimating step is performed based on the directed graph structure created in the integrating step performed after the repeating step is performed a predetermined number of times.

According to an embodiment of the present invention, the first directed graph structure including the first branch node added thereto has a closed path including two nodes including a corresponding character string, at least one node detected in the first directed graph structure, and at least one node detected in the second directed graph structure, and the at least one node detected in the first directed graph structure and the at least one node detected in the second directed graph structure exists between the two nodes including the corresponding character string.

According to an embodiment of the present invention, in case that the closed path includes a plurality of closed paths, the detecting step further includes a determining step of recursively determining, from a smaller closed path of the plurality of closed paths, that the appearance tendencies of character strings are similar to each other.

According to an embodiment of the present invention, the method further includes:

an outputting step of outputting the first directed graph structure in which the nodes having similar appearance tendencies of character strings are integrated into one node as an automaton.

According to an embodiment of the present invention, the method further includes:

a creating step of creating a third directed graph structure by dividing a third log message by the predetermined characters to define divided portions as nodes and arranging the nodes in order from the beginning of the third log message;

a determining step of determining whether a node in the third directed graph structure corresponds to a node in the automaton;

a detecting step of comparing, in accordance with a node in the third directed graph structure being different from a node in the automaton, nodes in the first directed graph structure including the first branch node added thereto with nodes in the third directed graph structure to detect a node in the first directed graph structure including the first branch node added thereto and a node in the third directed graph structure that are nodes other than nodes including a corresponding character string; and an adding step of adding to the first directed graph structure including the first branch node added thereto the node detected in the third directed graph structure among the detected nodes as a second branch node, and the estimating step is performed based on the first directed graph structure including the second branch node added thereto.

According to an embodiment of the present invention, the determining step of determining whether the node in the third directed graph structure corresponds to the node in the automaton may include:

a determining step of determining, in accordance with at least one node in the third directed graph structure satisfying a predetermined condition with respect to the integrated node in the automaton, that the node in the third directed graph structure corresponds to the node in the automaton.

According to an embodiment of the present invention, the detecting step includes:

a searching step of searching for, in case that a node in the first directed graph structure and a node in the second directed graph structure that include a different character string are found, a subgraph and a path including the largest number of partially corresponding nodes in the found nodes.

According to an embodiment of the present invention, the searching step is performed using a memorizing recursion technique.

According to an embodiment of the present invention, the estimating step includes:

an estimating step of estimating the format, by scanning at least a path passing from an origin node to a terminal node of the first directed graph structure including the first branch node added thereto.

According to an embodiment of the present invention, in case that the path includes a plurality of paths, the format includes the first portion, the second portion, and, optionally, the third portion, which are associated with nodes in the plurality of paths.

According to an embodiment of the present invention, the predetermined characters are signs or blank characters.

According to an embodiment of the present invention, the second portion is a sign representing an arbitrary character string.

According to a second aspect of the invention, a computer for estimating a format of a log message, includes:

directed graph structure creation means for creating a first directed graph structure by dividing a first log message by predetermined characters to define divided portions as nodes and arranging the nodes in order from the beginning of the first log message, and creating a second directed graph structure by dividing a second log message by the predetermined characters to define divided portions as nodes and arranging the nodes in order from the beginning of the second log message;

node detection means for comparing nodes in the first directed graph structure with nodes in the second directed graph structure to detect a node in the first directed graph structure and a node in the second directed graph structure that are nodes other than nodes including a corresponding character string;

directed graph structure change means for adding to the first directed graph structure the node detected in the second directed graph structure among the detected nodes as a first branch node; and format estimation means for estimating the format, based on the first directed graph structure including the first branch node added thereto, wherein the format includes a first portion associated with a node including a corresponding character string, a second portion associated with a node whose appearance tendency of character string is similar between the node detected in the first directed graph structure and the node detected in the second directed graph structure, and, optionally, a third portion associated with a node other than nodes having a similar appearance tendency of character string.

According to an embodiment of the present invention, the computer repeats the creating, with the directed graph structure creation means, the second directed graph structure, the detecting, with the node detection means, a node in the first directed graph structure and a node in the second directed graph structure that are nodes other than nodes including a corresponding character string, and the adding, with the directed graph structure change means, to the first directed graph structure the node detected in the second directed graph structure as a first branch node.

According to an embodiment of the present invention, the format estimation means estimates the format, based on the directed graph structure created by the directed graph structure change means, after the repeating is performed a predetermined number of times.

According to an embodiment of the present invention, the directed graph structure change means integrates the nodes having similar appearance tendencies of character strings into one node in the first directed graph structure including the first branch node added thereto, and the format estimation means estimates the format, based on the first directed graph structure in which the nodes having similar appearance tendencies of character strings are integrated into one node.

According to an embodiment of the present invention, a determination that the appearance tendencies of character strings are similar to each other is performed on the basis of:

a first condition that a percentage of character strings having similar character types is equal to or more than a predetermined value, a second condition that a character length is equal to or more than a predetermined value, a third condition that an editing distance between characters is short, or a fourth condition that at least two of the first to third conditions are satisfied.

According to an embodiment of the present invention, the computer repeats the creating, with the directed graph structure creation means, the second directed graph structure, the detecting, with the node detection means, a node in the first directed graph structure and a node in the second directed graph structure that are nodes other than nodes including a corresponding character string, the adding, with the directed graph structure change means, to the first directed graph structure the node detected in the second directed graph structure as a first branch node, and the integrating, with the directed graph structure change means, the nodes having similar appearance tendencies of character strings into one node in the first directed graph structure including the first branch node added thereto.

According to an embodiment of the present invention, the format estimation means estimates the format, based on the directed graph structure created by the integration by the directed graph structure change means after the repeating is performed a predetermined number of times.

According to an embodiment of the present invention, the first directed graph structure including the first branch node added thereto has a closed path including two nodes including a corresponding character string, at least one node detected in the first directed graph structure, and at least one node detected in the second directed graph structure, and the at least one node detected in the first directed graph structure and the at least one node detected in the second directed graph structure exist between the two nodes including the corresponding character string.

According to an embodiment of the present invention, in case that the closed path includes a plurality of closed paths, the node detection means may further recursively determine, from a smaller closed path of the plurality of closed paths, that the appearance tendencies of character strings are similar to each other.

According to an embodiment of the present invention, the computer further includes:

automaton output means for outputting the first directed graph structure in which the nodes having similar appearance tendencies of character strings are integrated into one node as an automaton.

According to an embodiment of the present invention, the directed graph structure creation means further creates a third directed graph structure by dividing a third log message by the predetermined characters to define divided portions as nodes and arranging the nodes in order from the beginning of the third log message, the node detection means further determines whether a node in the third directed graph structure corresponds to a node in the automaton, the node detection means further compares, in accordance with a node in the third directed graph structure being different from a node in the automaton, nodes in the first directed graph structure including the first branch node added thereto with nodes in the third directed graph structure to detect a node in the first directed graph structure including the first branch node added thereto and a node in the third directed graph structure that are nodes other than nodes including a corresponding character string, and the directed graph structure change means further adds to the first directed graph structure including the first branch node added thereto the node detected in the third directed graph structure among the detected nodes as a second branch node, and the format estimation means further estimates the format, based on the first directed graph structure including the second branch node added thereto.

According to an embodiment of the present invention, the determination by the node detection means as to whether the node in the third directed graph structure corresponds to the node in the automaton may include a further determination by the node detection means that the node in the third directed graph structure corresponds to the node in the automaton, in accordance with at least one node in the third directed graph structure satisfying a predetermined condition with respect to the integrated node in the automaton.

According to an embodiment of the present invention, the node detection means searches for, in case that a node in the first directed graph structure and a node in the second directed graph structure that include a different character string are found, a subgraph and a path including the largest number of partially corresponding nodes in the found nodes.

According to an embodiment of the present invention, the node detection means performs the searching using a memorizing recursion technique.

According to an embodiment of the present invention, the format estimation means estimates the format, by scanning at least a path passing from an origin node to a terminal node of the first directed graph structure including the first branch node added thereto.

According to an embodiment of the present invention, in case that the path includes a plurality of paths, the format includes the first portion, the second portion, and, optionally, the third portion, which are associated with nodes in the plurality of paths.

According to an embodiment of the present invention, the predetermined characters are signs or blank characters.

According to an embodiment of the present invention, the second portion is a sign representing an arbitrary character string.

According to a third aspect of the invention, a computer program and a computer program product causes the computer to execute the individual steps of the method for estimating a format of a log message according to the first aspect of the invention.

A computer program according to an embodiment of the present invention is stored in a desired computer-readable recording medium, such as one or more flexible disk, an MO, a CD-ROM, a DVD, a BD, a hard disk device, a USB-connectable memory medium, a ROM, an MRAM, or a RAM. In order to store the computer program into a recording medium, the computer program is downloaded from a different data processing system connected via a communication line, such as a computer, or may be reproduced from a different recording medium. Furthermore, a computer program according to an embodiment of the present invention is compressed, divided into a plurality of units, and stored into a single or plural recording media. Furthermore, it should be noted that obviously, a computer program product according to an embodiment of the present invention is provided in various forms. A computer program product according to an embodiment of the present invention includes, for example, a storage medium in which the computer program is recorded or a transmission medium which transmits the computer program.

It should be noted that the above summary of the invention is not a complete list of all essential features of the present invention, and combinations or sub-combinations of the above elements can also constitute the present invention.

Obviously, various modifications, such as combining the individual hardware components of a computer used in an embodiment of the present invention with multiple machines and distributing functions to the combined hardware components and multiple machines, is easily conceivable by those skilled in the art. These modifications are concepts naturally included in the spirit of the present invention. However, these components are merely exemplifications, and not all of these components are necessarily essential for the present invention.

Furthermore, the present invention is implemented as hardware, software, or a combination of hardware and software. A typical example of implementation as a combination of hardware and software is implementation of the program in a computer including the computer program installed therein. In such a case, when the computer program is loaded to a memory of the computer and executed, the computer program controls the computer and causes the computer to perform processing according to the present invention. The computer program includes a set of instructions that can be expressed in any language, code, or notation. Such a set of instructions is intended to allow the computer to perform a particular function, either directly or after 1) conversion into a different language, code, or notation, and/or 2) reproduction in another medium.

Formats of log messages estimated according to a log message analysis method, which is a conventional technique, such as natural language processing, are susceptible to confusion and noise. In contrast, formats of log messages estimated according to an embodiment of the present invention have an advantage of being able to determine a parameter portion (a so-called variable part of a log message) for a log message which does not have a format definition.

For example, in the case where there are a plurality of types of log messages, by handling each log message as a key, it is possible to perform processing for obtaining the relationship between the log messages. Thus, by using the obtained relationship between the log messages as a correlation-rule, an effect of being able to easily find a related transaction can be achieved.

Furthermore, when a parameter portion includes a numerical value or when it is easy to grasp the tendency of appearing character strings or words, it is possible to use a change in the parameter for abnormality detection. For example, since abnormality may intermittently occur even when dealing with a trouble in the system, comparing a different event with an error indicated by a log message contributes to easier identification of a portion where a problem has occurred.

Furthermore, by visualizing a log message based on a parameter, it becomes possible to obtain the whole picture of the system associated with the log message or identify a portion where a problem has occurred.

Furthermore, with a clustering-based method, which is a conventional technique, if a log message includes a large number of variable parts or a log message is output in a free format, even the same structure is determined as a different log message type. In contrast, with the format of a log message estimated according to an embodiment of the present invention, the above problems can be avoided, and portions including the same structure can be identified. Furthermore, with the technique for estimating the format of a log message according to an embodiment of the present invention, similar items, such as numerical values, user names, or host names, can be extracted easily, and it can therefore be expected to extract an appropriate parameter from a log message.

Furthermore, according to an embodiment of the present invention, since log messages have properties of being output in formats determined to some extent, it becomes easier to detect the variable part, and at the same time, it is expected to make integration of a large number of variable parts into a node (node in an existing directed graph structure). Due to the above properties, it can be expected to achieve convergence of a search range of a directed graph structure to some extent, without causing the directed graph structure to explosively grow in accordance with the number of log messages.

Consequently, according to an embodiment of the present invention, the operation time for data analysis based on a log message can be shortened.

DETAILED DESCRIPTION

Figure 1:
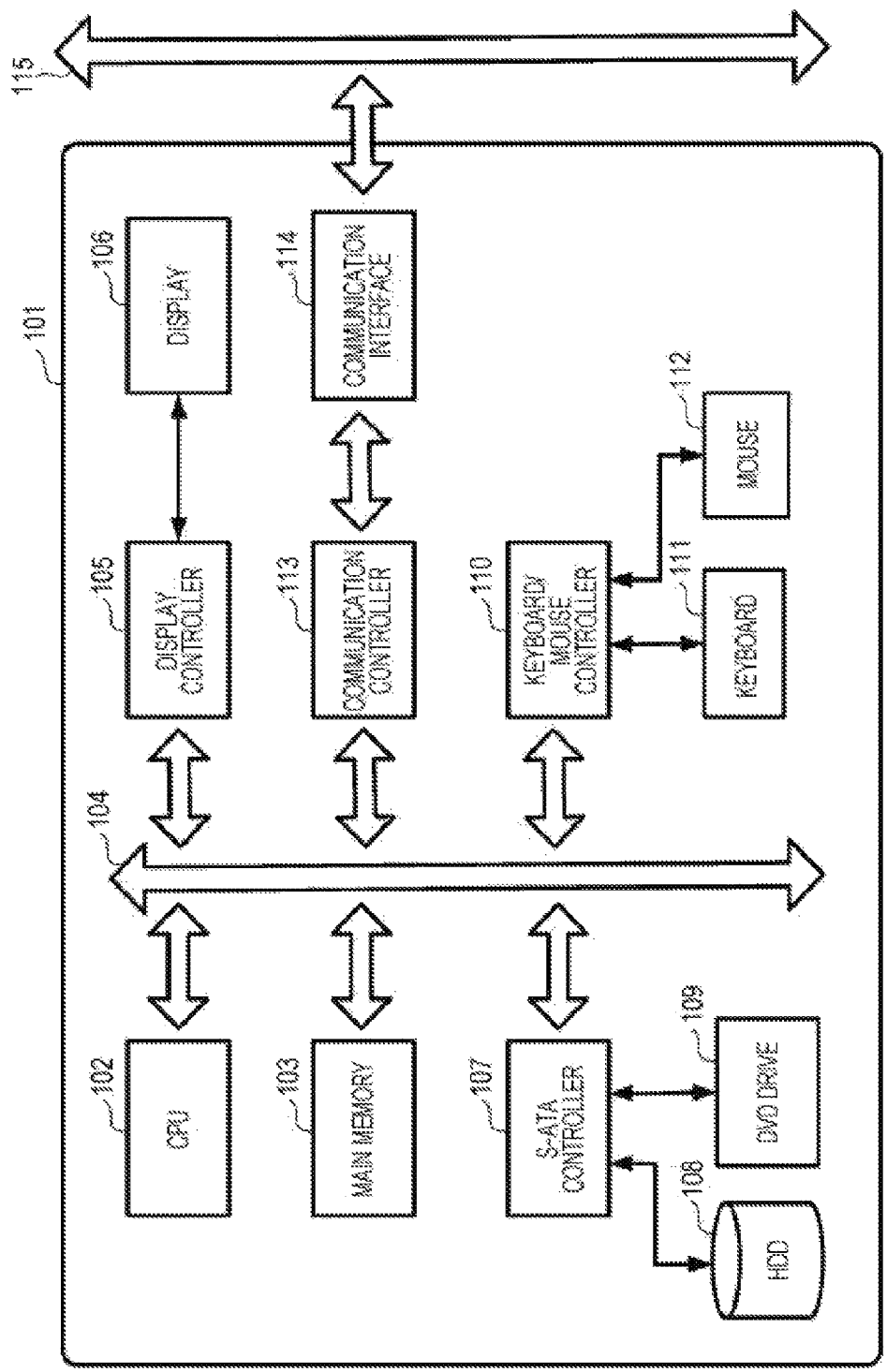
FIG. 1 is a diagram illustrating an example of a hardware configuration for implementing a computer which may be used in an embodiment of the present invention.

Embodiments of the present invention will be explained with reference to the drawings. Unless otherwise noted, the same signs represent the same objects throughout the drawings. It should be understood that the embodiments of the present invention are merely for describing preferred aspects of the present invention and are not intended to limit the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a diagram illustrating an example of a computer which may be used in an embodiment of the present invention.

A computer according to an embodiment of the present invention includes one or more computers.

FIG. 1 is a diagram illustrating an example of a hardware configuration for implementing a computer which may be used in an embodiment of the present invention.

A computer (101) is, for example, a desk-top computer, a notebook computer, an ultrabook computer, or a server computer.

The computer (101) includes a CPU (102) and a main memory (103) which are connected to a bus (104). Preferably, the CPU (102) is based on a 32-bit or 64-bit architecture. The CPU (102) may be, for example, Core (trademark) i series, Core (trademark) 2 series, Atom (trademark) series, Xeon (registered trademark) series, Pentium (registered trademark) series, or Celeron (registered trademark) series by Intel, A series, Phenom (trademark) series, Athlon (trademark) series, Turion (trademark) series, or Sempron (trademark) by Advanced Micro Devices (AMD), or Power (trademark) series by International Business Machines Corporation.

To the bus (104), a display (106), such as a liquid crystal display (LCD), is connected via a display controller (105). The liquid crystal display (LCD) is, for example, a touch panel display or a floating touch display. The display (106) is used to display, with an appropriate graphic interface, information (for example, a log message, a directed graph structure, or the format of a log message) to be displayed when software, such as a computer program according to an embodiment of the present invention, operating on the computer (101) is executed.

Optionally, to the bus (104), a storage device (108), such as a hard disk or a solid state drive, is connected via an SATA or IDE controller (107).

Optionally, to the bus (104), the storage device (108) and a drive (109), such as a CD, a DVD, or a BD drive, is connected via the SATA or IDE controller (107).

Optionally, to the bus (104), a keyboard (111) and a mouse (112) is connected via a peripheral device controller (110), such as a keyboard/mouse controller or a USB bus.

In the storage device (108), an operating system, a Windows (registered trademark) OS, UNIX (registered trademark), Linux (registered trademark) (for example, RedHat (registered trademark), Debian (registered trademark)), a MacOS (registered trademark), a Java (registered trademark) processing environment, such as J2EE, a Java (registered trademark) application, a Java (registered trademark) virtual machine (VM), a program which provides Java (registered trademark) just-in-time (JIT) compiler, a computer program according to an embodiment of the present invention, other programs, and data (for example, a term list, content, etc.) are stored such that they are loaded into the main memory (103).

The storage device (108) is built in the computer (101), connected via a cable (for example, a USB cable or a LAN cable) so as to be accessed by the computer (101), or connected via a wired or wireless network so as to be accessed by the computer (101).

The drive (109) is used, as necessary, for example, to install a program, such as an operating system or an application, from a CD-ROM, a DVD-ROM, or a BD-ROM into the storage device (108).

A communication interface (114) conforms to, for example, an Ethernet (registered trademark) protocol. The communication interface (114) is connected to the bus (104) via a communication controller (113), functions to connect the computer (101) to a communication line (115) in a wired or wireless manner, and provides a network interface layer to a TCP/IP communication protocol of a communication function of the operating system of the computer (101). The communication line is, for example, under a wired LAN environment based on a wired LAN connection standard, a wireless LAN environment based on a wireless LAN connection standard, a Wi-Fi wireless LAN environment, such as IEEE 802.11a/b/g/n, or a portable telephone network environment (for example, a 3G or 4G (including LTE) environment).

The computer (101) receives data from, for example, a different apparatus (for example, a computer or a network-attached storage) via the communication line (115) and may store the received data into the storage device (108).

Figure 2:
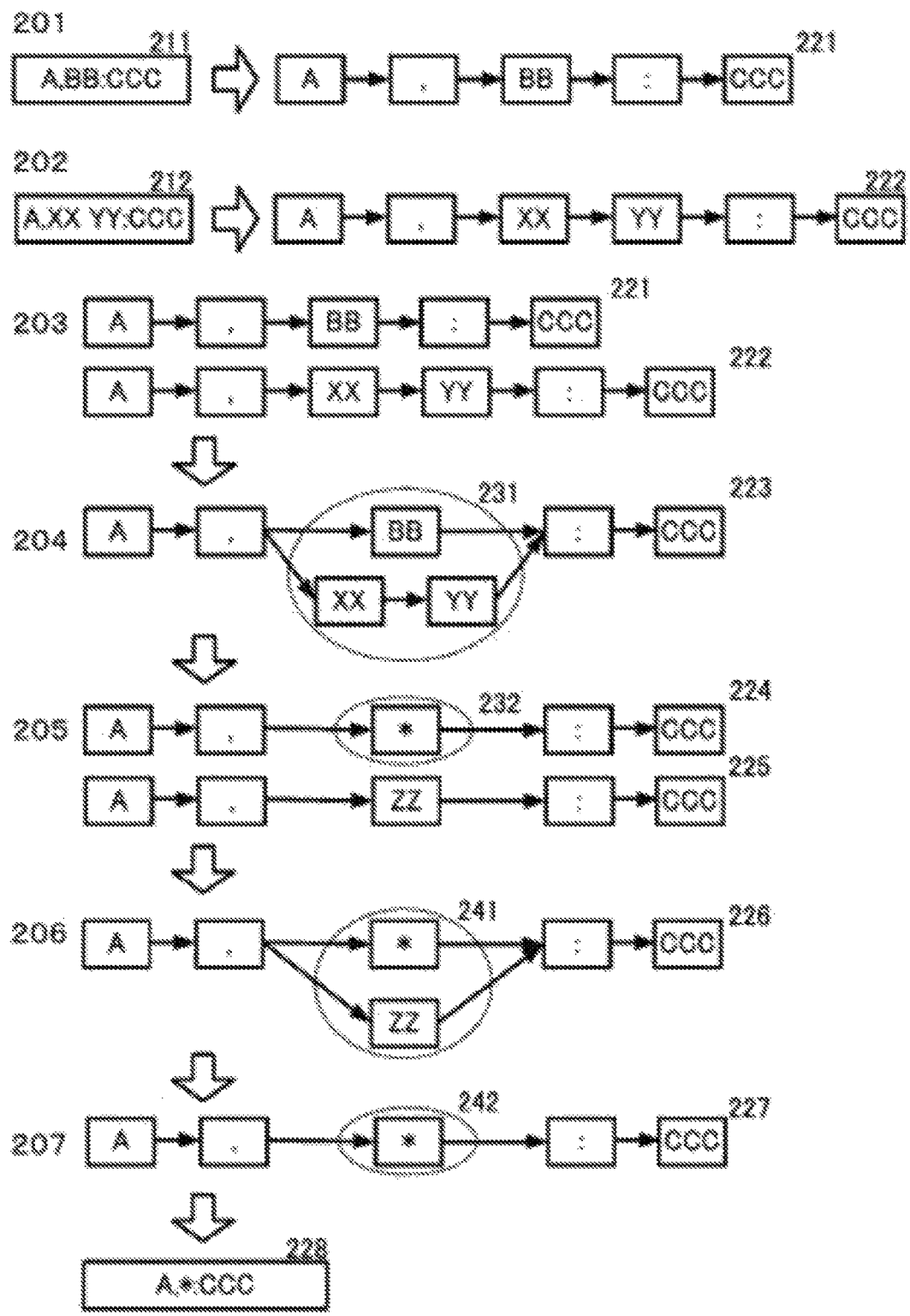
FIG. 2 is a diagram for illustrating a process for estimating a format from a log message according to an embodiment of the present invention.
Figure 3:
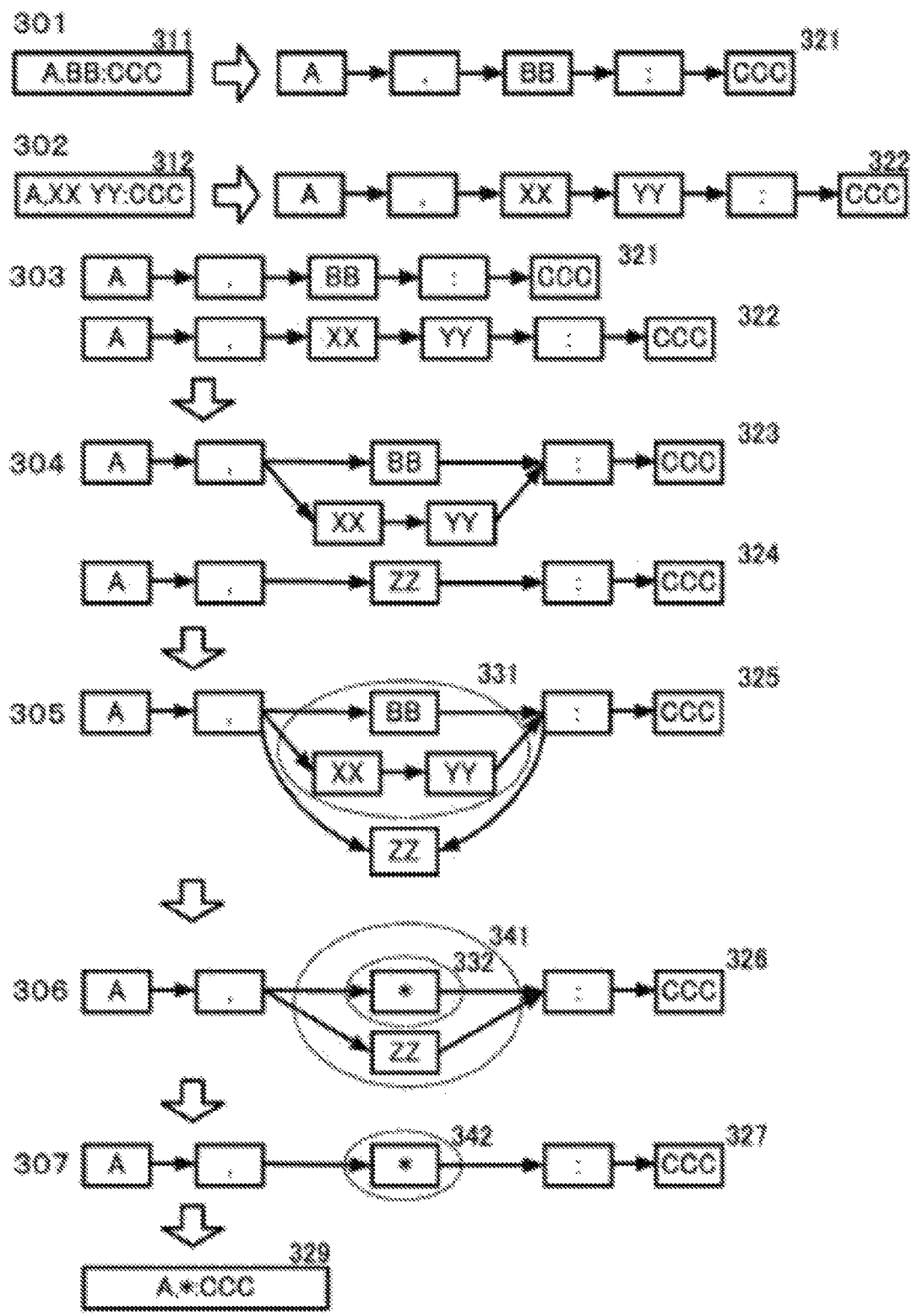
FIG. 3 is a diagram for illustrating a process for estimating a format from a log message according to an embodiment of the present invention.
Figure 4:
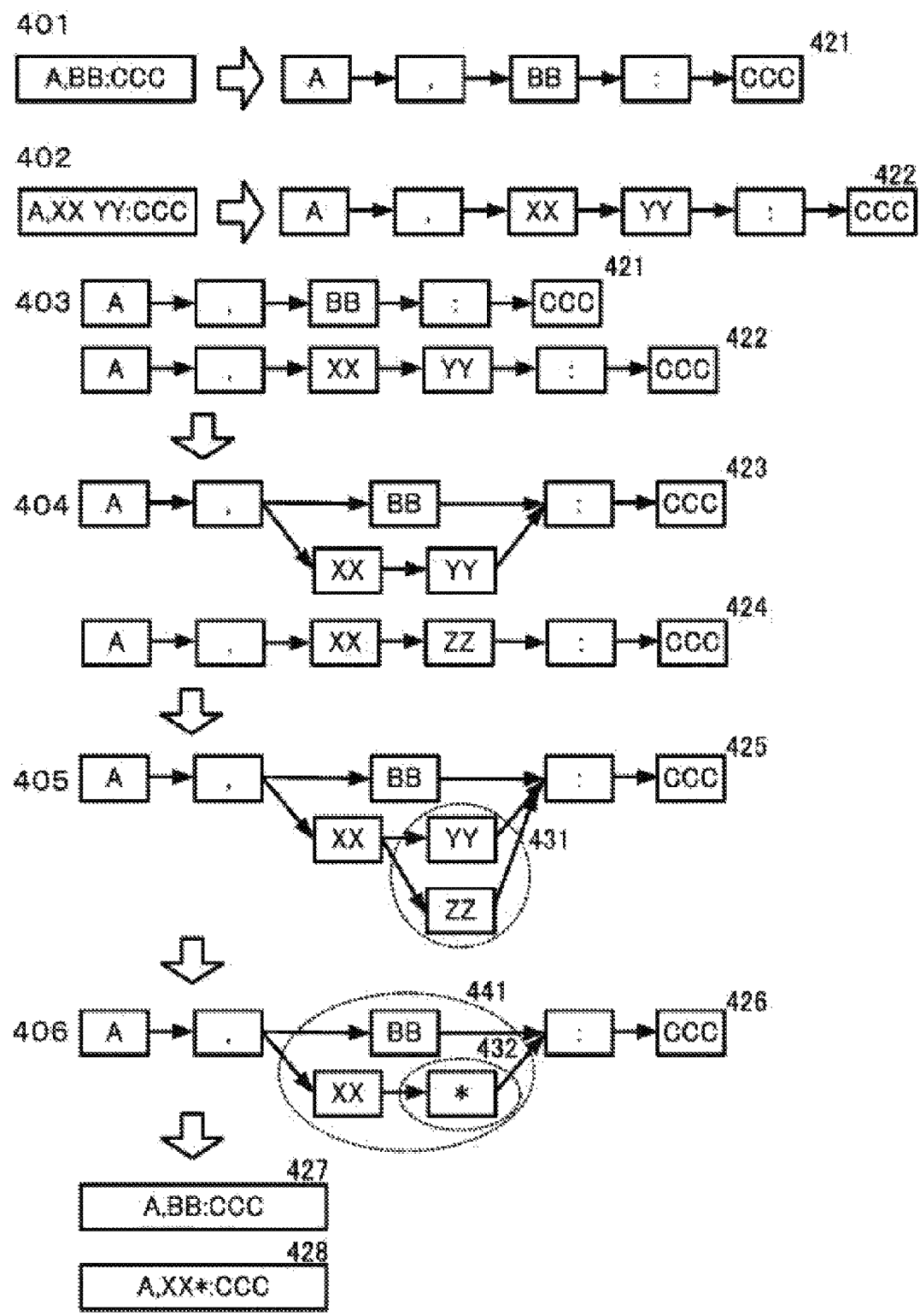
FIG. 4 is a diagram for illustrating a process for estimating a format from a log message according to an embodiment of the present invention.

FIGS. 2, 3, and 4 are diagrams for illustrating processes for estimating a format from a log message according to an embodiment of the present invention.

The diagram illustrated in FIG. 2 illustrates a first exemplified aspect of a process for estimating a format from a log message according to an embodiment of the present invention.

In step 201, the computer (101) acquires a log message (211) from, for example, a storage medium (for example, the storage device (108) illustrated in FIG. 1) in which log messages are stored. The log message (211) includes characters and signs "A,BB:CCC". The computer (101) divides the log message (211) by predetermined characters (for example, signs or blank characters). The log message (211) is divided by the predetermined characters into character strings: "A", ",", "BB", ":", and "CCC". The computer (101) creates a directed graph structure (221) for the log message (211) by arranging nodes which represent the divided character strings in order from the beginning of the log message (211).

In step 202, the computer (101) acquires a new log message (212) from, for example, the storage medium in which log messages are stored. The log message (212) includes characters and signs "A,XX YY:CCC" (there is a blank character between "XX" and "YY"). The computer (101) divides the log message (212) by predetermined characters (for example, signs or blank characters). The log message (212) is divided by the predetermined characters into character strings: "A", ",", "XX", "YY", ":", and "CCC". The computer (101) creates a directed graph structure (222) for the log message (212) by arranging nodes which represent the divided character strings in order from the beginning of the log message (212). The form of the division illustrated in FIG. 2 is an example of the case where a blank character is not considered as a node.

In step 203, the computer (101) compares nodes in the directed graph structure (221) based on the log message (211) with nodes in the directed graph structure (222) based on the log message (212) to detect a node in the directed graph structure (221) and a node in the directed graph structure (222) that include a corresponding character string. By the above comparison, the computer (101) detects that the nodes "A", ",", ":", and "CCC" are corresponding nodes. Furthermore, by the above comparison, the computer (101) detects character strings that are different between the nodes, that is, the node "BB" in the directed graph structure (221) and the node "XX" and the node "YY" in the directed graph structure (222). A method for determining character strings that are different between the nodes in the above comparison will be explained in detail in FIG. 5A and an explanation provided later corresponding to FIG. 5A.

Then, by the above comparison, the computer (101) defines the corresponding nodes "A", ",", ":", and "CCC" as the same nodes, and integrates the nodes "A", ",", ":", and "CCC" in the directed graph structure (222) based on the log message (212) into the nodes "A", ",", ":", and "CCC" in the directed graph structure (221) based on the log message (211). Therefore, the nodes "A", ",", ":", and "CCC" in the directed graph structure (221) based on the log message (211) are not substantially changed, and a number on the edge between the node "A" and the node "," and a number on the edge between the node ":" and the node "CCC" are each incremented by one. The numbers on the edges between the nodes each represent a number obtained by integration between a node in the directed graph structure (221) based on the log message (211) and a corresponding node in a different directed graph structure.

The computer (101) adds, as branch nodes, the nodes "XX" and "YY" in the directed graph structure (222) based on the log message (212), which are associated with the different character strings, to the directed graph structure (221) based on the log message (211) to create a directed graph structure (223) (that is, the directed graph structure (221) is updated to create the directed graph structure (223)).

In step 204, in accordance with the integration between the directed graph structure (221) and the directed graph structure (222), the computer (101) determines whether the appearance tendency is similar between a character string in a main node and a character string in a branch node in a closed path (231) of the directed graph structure (223) that includes a branch node. That is, the computer (101) determines whether the appearance tendency is similar between the character string in the main node "BB" and the character strings in the branch nodes "XX" and "YY". The main node "BB" and the branch nodes "XX" and "YY" are nodes included in a portion from the node immediately after the start of branching to a point immediately before merging of branch nodes in the closed path (231). In accordance with a similar appearance tendency between the character string in the main node "BB" and the character strings in the branch node "XX" and the branch node "YY", the computer (101) integrates the main node "BB" and the branch nodes "XX" and "YY" into one node (232). Then, the computer (101) provides the integrated node (232) with an asterisk (*) representing an arbitrary character string as a character string included in the integrated node, and creates a directed graph structure (224) (that is, the directed graph structure (223) is updated to create the directed graph structure (224)).

In step 205, similar to step 201 and step 202, the computer (101) acquires a log message (not illustrated) "A,ZZ:CCC" from, for example, a storage medium (for example, the storage device (108) illustrated in FIG. 1) in which log messages are stored, and divides the acquired log message by predetermined characters (for example, signs or blank characters). The acquired log message is divided by the predetermined characters into character strings: "A", ",", "ZZ", ":", and "CCC". The computer (101) creates a directed graph structure (225) for the acquired log message by arranging nodes which represent the divided character strings in order from the beginning of the acquired log message.

Then, the computer (101) compares nodes in the directed graph structure (224) with nodes in the directed graph structure (225) to detect a node in the directed graph structure (224) and a node in the directed graph structure (225) that include a corresponding character string. By the above comparison, the computer (101) detects that the nodes "A", ",", ":", and "CCC" are corresponding nodes. Furthermore, by the above comparison, the computer (101) detects character strings that are different between the nodes, that is, the node "*" in the directed graph structure (224) and the node "ZZ" in the directed graph structure (225).

The computer (101) adds, as a branch node, the node "ZZ" in the directed graph structure (225), which is associated with the different character string, to the directed graph structure (224) to create a directed graph structure (226) (that is, the directed graph structure (224) is updated to create the directed graph structure (226)).

In step 206, the computer (101) determines whether the appearance tendency is similar between a character string in a main node and a character string in a branch node in a closed path (241) of the directed graph structure (226) that includes a branch node. That is, the computer (101) determines whether the appearance tendency is similar between the character string in the main node "*" and the character string in the branch node "ZZ". In accordance with a similar appearance tendency between the character string in the main node "*" and the character string in the branch node "ZZ", the computer (101) integrates the main node "*" and the branch node "ZZ" into one node. Then, the computer (101) provides the integrated node with an asterisk (*) representing an arbitrary character string as a character string included in the integrated node, and creates a directed graph structure (227) (that is, the directed graph structure (226) is updated to create the directed graph structure (227)).

In step 207, the computer (101) estimates a format, based on the directed graph structure (227). The estimated format (228) includes the nodes "A" and "," which include corresponding character strings, the node "*" which includes a different character string, and the nodes ":" and "CCC" which include corresponding character strings.

The diagram illustrated in FIG. 3 illustrates a second exemplified aspect of a process for estimating a format from a log message according to an embodiment of the present invention.

Processing performed in steps 301 to 303 is the same as the processing performed in steps 201 to 203 illustrated in FIG. 2. Therefore, explanation for steps 301 to 303 should be referred to the above explanation for steps 201 to 203.

By the processing of step 301 to step 303, the computer (101) creates a directed graph structure (323).

In step 304, similar to step 301 and step 302, the computer (101) acquires a log message (not illustrated) "A,ZZ:CCC" from, for example, a storage medium (for example, the storage device (108) illustrated in FIG. 1) in which log messages are stored, and divides the acquired log message by predetermined characters (for example, signs or blank characters). The acquired log message is divided by the predetermined characters into character strings: "A", ",", "ZZ", ":", and "CCC". The computer (101) creates a directed graph structure (324) for the acquired log message by arranging nodes which represent the divided character strings in order from the beginning of the acquired log message.

Then, the computer (101) compares nodes in the directed graph structure (323) with nodes in the directed graph structure (324) to detect a node in the directed graph structure (323) and a node in the directed graph structure (324) that include a corresponding character string. By the above comparison, the computer (101) detects that the nodes "A", ",", ":", and "CCC" are corresponding nodes. Furthermore, by the above comparison, the computer (101) detects character strings that are different between the nodes, that is, the nodes "BB", "XX", and "YY" in the directed graph structure (323) and the node "ZZ" in the directed graph structure (324).

By the above comparison, the computer (101) defines the corresponding nodes "A", ",", ":", and "CCC" as the same nodes, and integrates the nodes "A", ",", ":", and "CCC" in the directed graph structure (324) into the nodes "A", ",", ":", and "CCC" in the directed graph structure (323). Therefore, the nodes "A", ",", ":", and "CCC" in the directed graph structure (323) are not substantially changed, and a number on the edge between the node "A" and the node "," and a number on the edge between the node ":" and the node "CCC" are each incremented by one.

The computer (101) adds, as a branch node, the node "ZZ" in the directed graph structure (324), which is associated with the different character string, to the directed graph structure (323) to create a directed graph structure (325) (that is, the directed graph structure (323) is updated to create the directed graph structure (325)).

In step 305, in accordance with the integration among the three directed graph structures (321, 322, and 324), the computer (101) determines whether the appearance tendency is similar between a character string in a main node and a character string in a branch node in a smaller closed path (331) included in a plurality of paths in the directed graph structure (325) that includes a branch node created in step 306. That is, the computer (101) determines whether the appearance tendency is similar between the character string in the main node "BB" and the character strings in the branch nodes "XX" and "YY". In accordance with a similar appearance tendency between the character string in the main node "BB" and the character strings in the branch nodes "XX" and "YY", the computer (101) integrates the main node "BB" and the branch nodes "XX" and "YY" into one node (332). Then, the computer (101) provides the integrated node (332) with an asterisk (*) representing an arbitrary character string as a character string included in the integrated node, and creates a directed graph structure (326) (that is, the directed graph structure (325) is updated to create the directed graph structure (326)).

In step 306, the computer (101) determines whether the appearance tendency is similar between a character string in a main node and a character string in a branch node in a closed path (341) of the directed graph structure (326) that includes a branch node. That is, the computer (101) determines whether the appearance tendency is similar between the character string in the main node "*" and the character string in the branch node "ZZ". In accordance with a similar appearance tendency between the character string in the main node "*" and the character string in the branch node "ZZ", the computer (101) integrates the main node "*" and the branch node "ZZ" into one node (342). Then, the computer (101) provides the integrated node (342) with an asterisk (*) representing an arbitrary character string as a character string included in the integrated node, and creates a directed graph structure (327) (that is, the directed graph structure (326) is updated to create the directed graph structure (327)).

In step 307, the computer (101) estimates a format, based on the directed graph structure (327). The estimated format (329) includes the nodes "A" and "," which include corresponding character strings, the node "*" which includes a different character string, and the nodes ":" and "CCC" which include corresponding character strings.

The diagram illustrated in FIG. 4 illustrates a third exemplified aspect of a process for estimating a format from a log message according to an embodiment of the present invention.

Processing performed in steps 401 to 403 is the same as the processing performed in steps 201 to 203 illustrated in FIG. 2. Therefore, explanation for steps 401 to 403 should be referred to the above explanation for steps 201 to 203.

By the processing of step 401 to step 403, the computer (101) creates a directed graph structure (423).

In step 404, similar to step 401 and step 402, the computer (101) acquires a log message (not illustrated) "A,XX YY:CCC" (there is a blank character between "XX" and "YY") from, for example, a storage medium (for example, the storage device (108) illustrated in FIG. 1) in which log messages are stored, and divides the acquired log message by predetermined characters (for example, signs or blank characters). The acquired log message is divided by the predetermined characters into character strings: "A", ",", "XX", "YY", ":", and "CCC". The computer (101) creates a directed graph structure (424) for the acquired log message by arranging nodes which represent the divided character strings in order from the beginning of the acquired log message.

Then, the computer (101) compares nodes in the directed graph structure (423) with nodes in the directed graph structure (424) to detect a node in the directed graph structure (423) and a node in the directed graph structure (424) that include a corresponding character string. By the above comparison, the computer (101) detects that the nodes "A", ",", ":", and "CCC" are corresponding nodes. Furthermore, by the above comparison, the computer (101) detects that the branch node "XX" in the directed graph structure (423) and the node "XX" in the directed graph structure (424) are the same. Furthermore, by the above comparison, the computer (101) detects character strings that are different between the nodes, that is, the node "BB" in the directed graph structure (423) and the node "YY" and the node "ZZ" in the directed graph structure (424).

By the above comparison, the computer (101) defines the corresponding nodes "A", ",", ":", and "CCC" as the same nodes, and integrates the nodes "A", ",", ":", and "CCC" in the directed graph structure (424) into the nodes "A", ",", ":", and "CCC" in the directed graph structure (423). Therefore, the nodes "A", ",", ":", and "CCC" in the directed graph structure (423) are not substantially changed, and a number on the edge between the node "A" and the node "," and a number on the edge between the node ":" and the node "CCC" are each incremented by one.

The computer (101) adds, as a branch node, the node "ZZ" in the directed graph structure (422), which is associated with the different character string, to the branch node in the directed graph structure (423) to create a directed graph structure (425) (that is, the directed graph structure (423) is updated to create the directed graph structure (425)).

In step 405, in accordance with the integration among the three directed graph structures (421, 422, and 424), the computer (101) determines whether the appearance tendency is similar between a character string in the node "YY" and a character string in the branch node "ZZ" in a smaller closed path (431) included in a plurality of paths in the directed graph structure (425) that includes a branch node created in step 404. In accordance with a similar appearance tendency between the character string in the node "YY" and the character string in the branch node "ZZ", the computer (101) integrates the node "YY" and the branch node "ZZ" into one node (432). Then, the computer (101) provides the integrated node (432) with an asterisk (*) representing an arbitrary character string as a character string included in the integrated node, and creates a directed graph structure (426) (that is, the directed graph structure (425) is updated to create the directed graph structure (426)).

In step 406, the computer (101) determines whether the appearance tendency is similar between a character string in a main node and a character string in a branch node in a closed path (441) of the directed graph structure (426) that includes a branch node. That is, the computer (101) determines whether the appearance tendency is similar between the character string in the main node "BB" and the character strings in the branch nodes "XX" and "*". In accordance with a different appearance tendency between the character string in the main node "BB" and the character strings in the branch nodes "XX" and "*", the computer (101) does not change the directed graph structure (426).

Then, the computer (101) estimates two formats, based on the directed graph structure (426). An estimated format (427) includes the nodes "A" and "," which include corresponding character strings, the node "BB" which includes a different character string and is a node other than those having a similar appearance tendency of character string, and the nodes ":" and "CCC" which include corresponding character strings. An estimated format (428) includes the nodes "A" and "," which include corresponding character strings, the node "XX" which includes a different character string and is a node other than those having a similar appearance tendency, the node "*" which includes a different character string of character string and has a similar appearance tendency of character string, and the nodes ":" and "CCC" which include corresponding character strings.

Figure 5A:
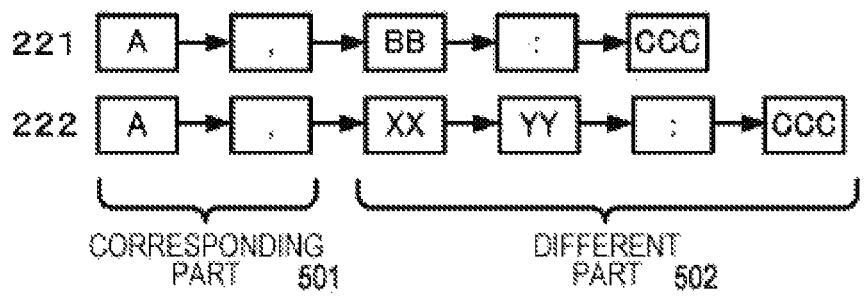
FIG. 5A is a diagram for illustrating a process for searching for a subgraph and a path including the largest number of partially corresponding nodes in an existing directed graph structure in a process for estimating a format from a log message according to an embodiment of the present invention.
Figure 5A:
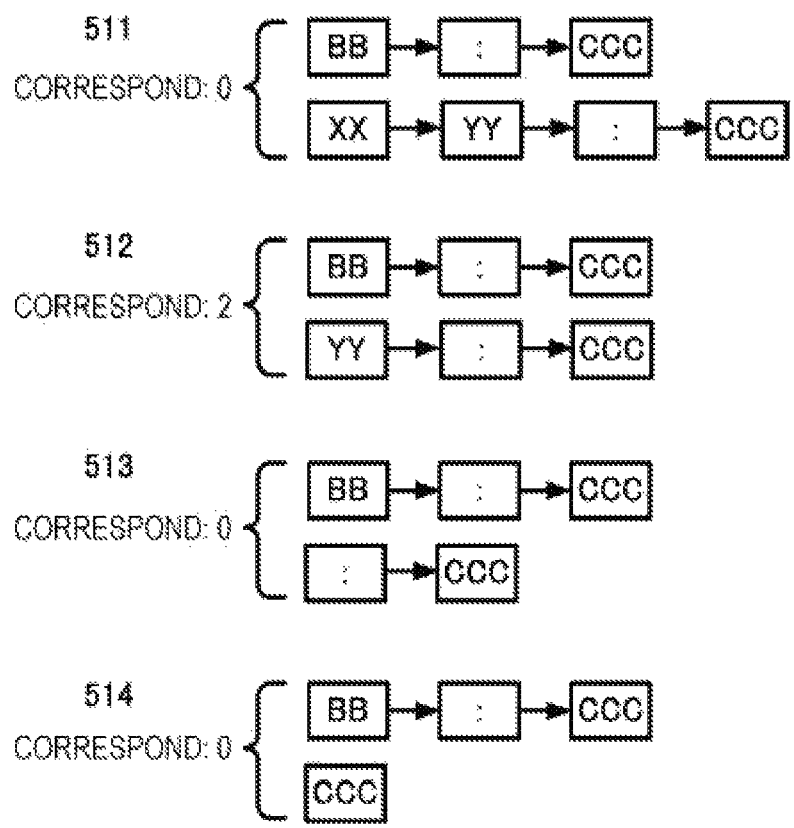

FIG. 5A is a diagram for illustrating a process for searching for a subgraph and a path including the largest number of partially corresponding nodes in an existing directed graph structure in a process for estimating a format from a log message according to an embodiment of the present invention.

The directed graph structure (221) is the same as that created in step 201 illustrated in FIG. 2. The directed graph structure (222) is the same as that created in step 202 illustrated in FIG. 2. The directed graph structure (221) is created earlier than the directed graph structure (222) and is therefore defined as an existing directed graph structure.

The computer (101) compares nodes in the directed graph structure (221) with nodes in the directed graph structure (222) to detect a node in the directed graph structure (221) and a node in the directed graph structure (222) that include a corresponding character string in step 203 illustrated in FIG. 2.

By performing the comparison as described above from the first node of each of the directed graph structures (221 and 222), the computer (101) detects that the nodes "A" and "," (501) are corresponding nodes.

Next, in accordance with an appearance of a different part (502) by the above comparison, the computer (101) searches for a subgraph and a path including the largest number of partially corresponding nodes in the directed graph structure (221). The computer (101) lists, for the nodes "BB", ":", and "CCC" in the directed graph structure (221) and the nodes "XX", "YY", ":", and "CCC" in the directed graph structure (222), all the combinations of nodes illustrated in FIG. 5A (511, 512, 513, and 514), and searches for the combination having the largest number of corresponding nodes. As a result, since the two nodes ":" and "CCC" are corresponding nodes in the combination (512), the computer (101) detects that the node "BB" in the directed graph structure (221) and the node "XX" and the node "YY" in the directed graph structure (222) have different string characters. Furthermore, the computer (101) detects that the node ":" and the node "CCC" in the above combination (512) are corresponding nodes.

As described above, by the above comparison, the computer (101) detects that the nodes "A", ",", ":", and "CCC" are corresponding nodes, and detects the character strings that are different between the nodes, that is, the node "BB" in the directed graph structure (221) and the node "XX" and the node "YY" in the directed graph structure (222).

In the example of the directed graph structure (221) and the directed graph structure (222) illustrated in FIG. 5A, searching in the case where there is no branch structure has been explained. In the case where a directed graph structure has a branch structure, the computer (101) performs searching for all the subgraphs and paths including a branch node.

The computer (101) searches for a subgraph and a path including the largest number of partially corresponding nodes in the directed graph structure (221). However, with a known processing method for a simple search order, the amount of calculation in the computer (101) significantly increases. As explained below with reference to FIG. 5B, the computer (101) searches for a subgraph and a path including the largest number of partially corresponding nodes in the directed graph structure (221) by using a processing method for a search order to which a memorizing recursion technique is applied.

Figure 5B:
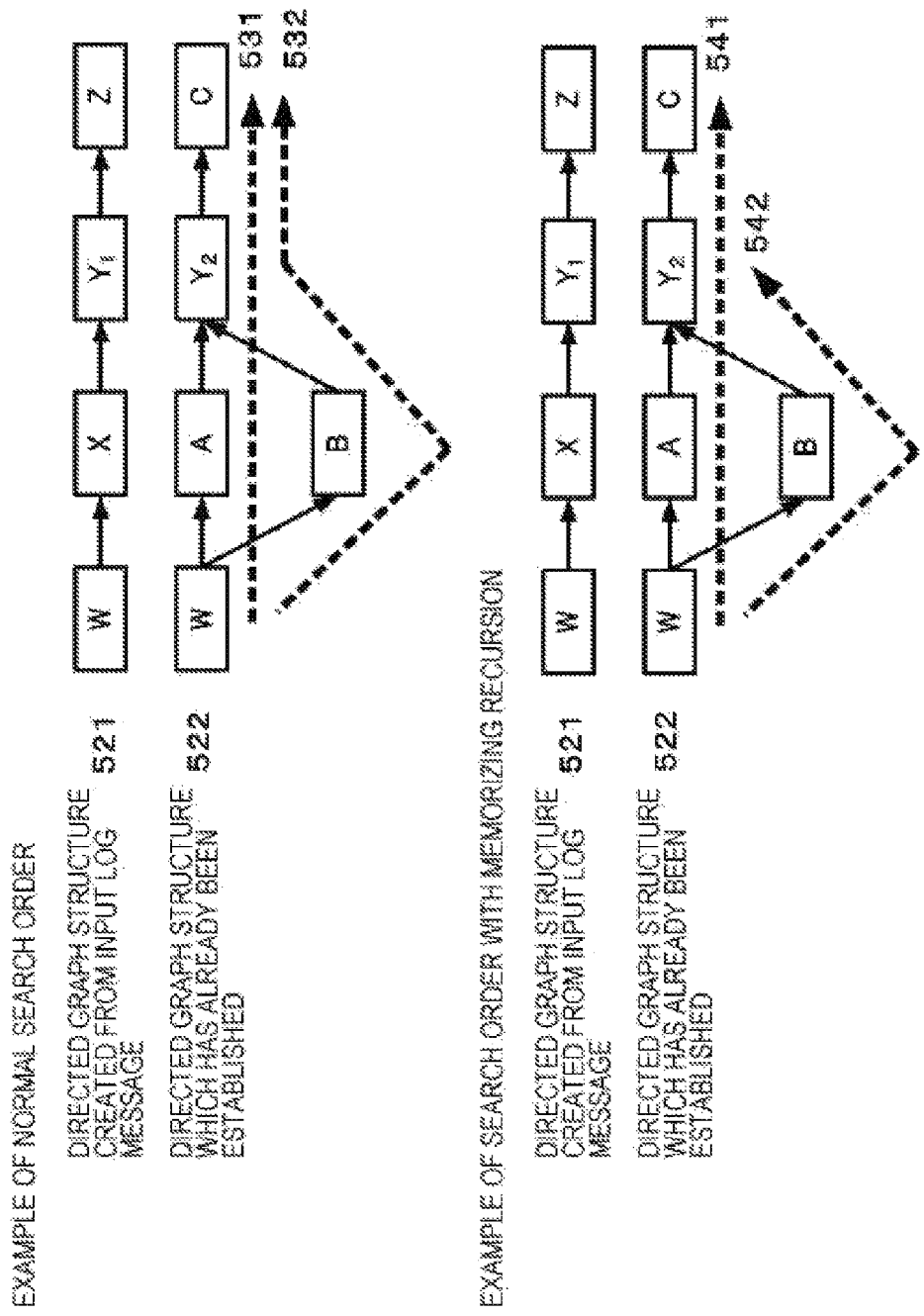
FIG. 5B is a diagram for searching for a path using a memorizing recursion technique in a process for estimating a format from a log message according to an embodiment of the present invention.

FIG. 5B is a diagram for searching for a path using a memorizing recursion technique in a process for estimating a format from a log message according to an embodiment of the present invention.

The computer (101) needs to try possibilities of connection to all the nodes, regardless of the directed graph structure, for example, in the processing of step 203 illustrated in FIG. 2, that is, in the processing for comparing nodes in the directed graph structure (221) with nodes in the directed graph structure (222) to detect a node in the directed graph structure (221) and a node in the directed graph structure (222) that include a corresponding character string. Similarly, the computer (101) needs to try possibilities of connection to all the nodes, regardless of the directed graph structure, in step 205 illustrated in FIG. 2, step 303 and step 304 illustrated in FIG. 3, and step 403 and step 404 illustrated in FIG. 4.

The processing method for a search order illustrated in an upper part of FIG. 5B illustrates a known processing method for a search order. The computer (101) compares nodes in a directed graph structure (521) created from an input log message with nodes in a directed graph structure (522) which has already been established. In accordance with the known processing method for a search order, the computer (101) first searches for all the nodes along an arrow (531), and then searches for all the nodes along an arrow (532). Thus, the computer (101) performs searching repeatedly even for a path which has already been searched for, and therefore this method is inefficient. Furthermore, in accordance with the known processing method for a search order, the amount of calculation is equivalent to $O(L^n)$, with respect to the number n of existing nodes and the input log message L.

The processing method for a search order illustrated in a lower part of FIG. 5B illustrates a processing method for a search order to which a memorizing recursion technique is applied. The computer (101) compares nodes in a directed graph structure (521) created from an input log message with nodes in a directed graph structure (522) which has already been established. In accordance with the processing method for a search order to which memorizing recursion (may also be referred to as memorization) is applied, the computer (101) first searches for all the nodes up to the end along an arrow (541) and records search results in a memo. A record of nodes which have been compared with each other and a result of the comparison are recorded in the memo. Next, the computer (101) searches for nodes along an arrow (542). However, the computer (101) refers to the memo created in the first search and proceeds to the second or later search only when a result of the comparison is not recorded in the memo. If a record of the result of the comparison (for example, a record of the result of comparison between further nodes in the combination of a node $Y_1$ and a node $Y_2$) exists in the memo, for example, a path from the node $Y_2$ to the node C has already been searched for in the search illustrated by the arrow (541), and therefore, the search result in the memo is read, without performing searching for the path from the node $Y_2$ to the node C. Thus, in accordance with the processing method for a search order to which the memorizing recursion technique is applied, there is no need to search for a path which has already been searched for, and therefore, the time complexity is reduced to about $O(L \cdot n^2)$, while a larger space complexity $O(L \cdot n)$ is required.

Figure 5C:
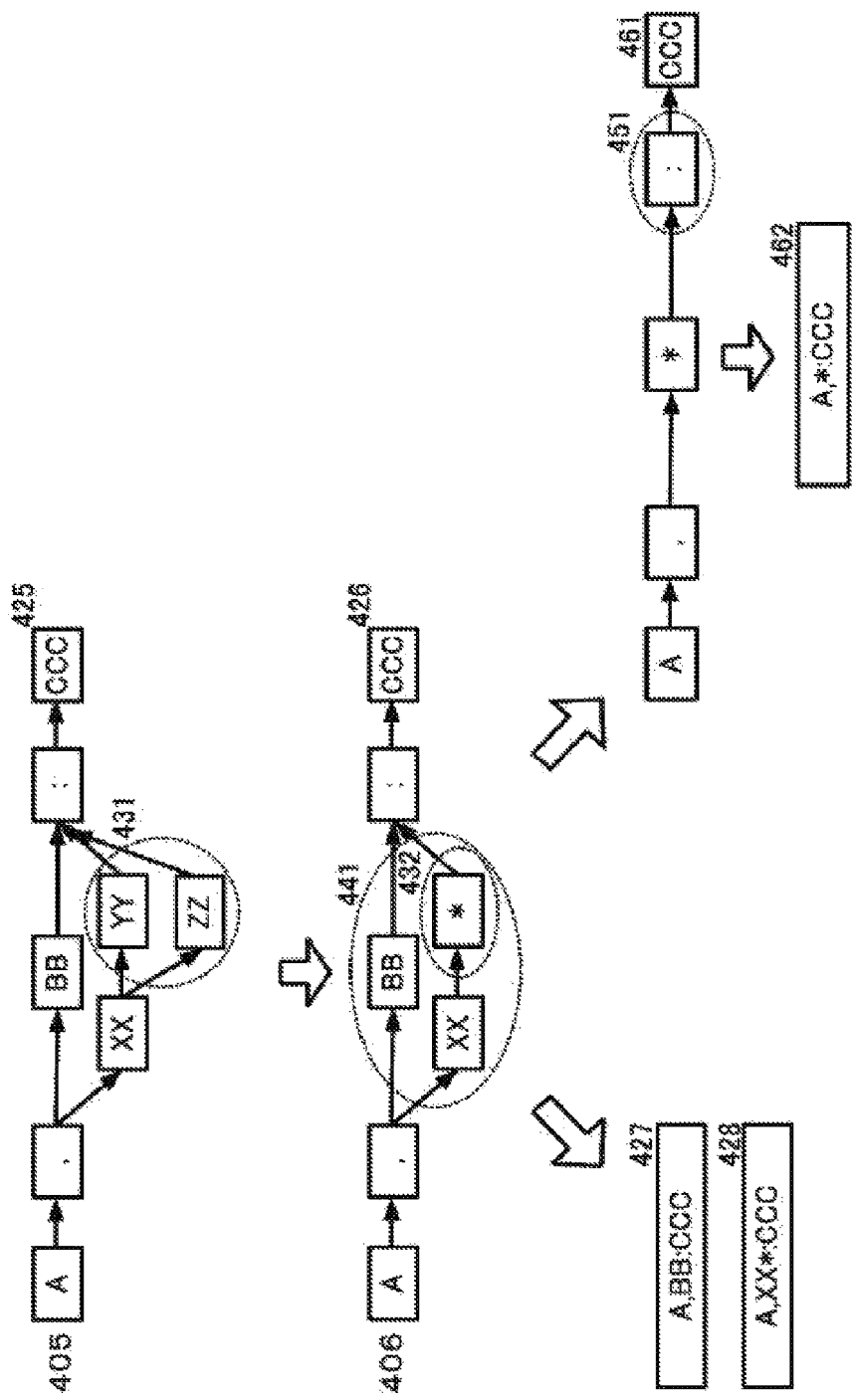
FIG. 5C is a diagram for detecting nodes which have similar appearance tendencies of character strings in a process for estimating a format from a log message according to an embodiment of the present invention.

FIG. 5C is a diagram for detecting nodes having similar appearance tendencies of character strings in a process for estimating a format from a log message according to an embodiment of the present invention.

A directed graph structure (425) is the same as that created in step 404 illustrated in FIG. 4.

In the case where a plurality of closed paths have an inclusion relationship in the directed graph structure (425) in step 405 illustrated in FIG. 4, the computer (101) determines whether the appearance tendency is similar between a character string in a node "YY" and a character string in a branch node "ZZ" in a smaller closed path (431) included in a plurality of closed paths that includes a branch node. In accordance with a similar appearance tendency between the character string in the node "YY" and the character string in the branch node "ZZ", the computer (101) integrates the node "YY" and the branch node "ZZ" into one node (432). Then, the computer (101) provides the integrated node (432) with an asterisk (*) representing an arbitrary character string as a character string included in the integrated node, and creates a directed graph structure (426).

The computer (101) determines whether the appearance tendencies of character strings are similar to each other, based on, for example, the following respect:

(1) the percentage of character strings having similar character types is equal to or more than a predetermined value;

(2) a character length is equal to or more than a predetermined value;

(3) the editing distance between characters is short; or (4) a combination of at least two of (1) to (3).

The percentage of character strings having similar character types is equal to or more than a predetermined value.

The above character strings include an alphabetical character, a number, a Chinese character, a hiragana character, a katakana character, and the like. For example, many of numerical values, such as statistical information, or identification information, such as a user name or a host name, which are handled as parameters, tend to appear with similar character types, and therefore have a tendency that the percentage of the character strings is equal to or more than a predetermined value. The predetermined value is set in a desired manner by a person who analyzes a log message.

A character length is equal to or more than a predetermined value.

A character length is, for example, the length of a one-byte character, the length of a two-byte character, or the length of a combination of one-byte and two-byte characters. A character length is set, for example, as an average character length. An average character length may not be a positive integer, such as 1.5 characters. The predetermined length is set in a desired manner by a person who analyzes a log message.

The editing distance between characters is short.

The editing distance between characters is calculated in accordance with a method which is also called an editing distance (may also be referred to as Levenshtein distance). For example, when there are a character string 1 "abcde", a character string 2 "abdce", and a character string 3 "aedcb", the editing distance (that is, an order) between the character string 1 and the character string 2 is shorter than the editing distance between the character string 2 and the character string 3, and therefore the character string 1 and the character string 2 are regarded as being more similar to each other than the character string 2 and the character string 3.

Furthermore, depending on the settings, the appearance tendencies of character strings are unconditionally made the same. As described above, by unconditionally making the appearance tendencies of character strings the same, an advantage is achieved in the case where, for example, a user of a log message desires to explicitly specify, as known information, "this part becomes a variable part", it is possible to make such a specification, and therefore intention of the user can also be taken into consideration, without completely depending on mechanical estimation.

Next, in the case where the directed graph structure (426) includes another closed path, the computer (101) recursively determines whether the appearance tendencies of character strings in nodes in the closed path are similar to each other. That is, the computer (101) determines whether the appearance tendency is similar between a character string in the main node "BB" and character strings in the branch node "XX" and the branch node "*" in a closed path (441) of the directed graph structure (426) that includes a branch node. The main node "BB" and the branch nodes "XX" and "*" are nodes included in a portion from the node immediately after the start of branching to a point immediately before merging of branch nodes in the closed path (441).

In accordance with a different appearance tendency between the character string in the main node "BB" and the character strings in the branch nodes "XX" and "*", the computer (101) does not change the directed graph structure (426). Then, the computer (101) estimates two formats (427 and 428), based on the directed graph structure (426).

In accordance with a similar appearance tendency between the character string in the main node "BB" and the character strings in the branch nodes "XX" and "*", the computer (101) integrates the main node "BB" and the branch nodes "XX" and "*" into one node (451). Then, the computer (101) provides the integrated node (451) with an asterisk (*) representing an arbitrary character string as a character string included in the integrated node, and creates a directed graph structure (461). Then, the computer (101) estimates a format, based on the directed graph structure (461). The estimated format (462) includes the nodes "A" and "*" which include corresponding character strings, the node "*" which includes a different character string, and the nodes ":" and "CCC" which include corresponding character strings.

Figure 5D:
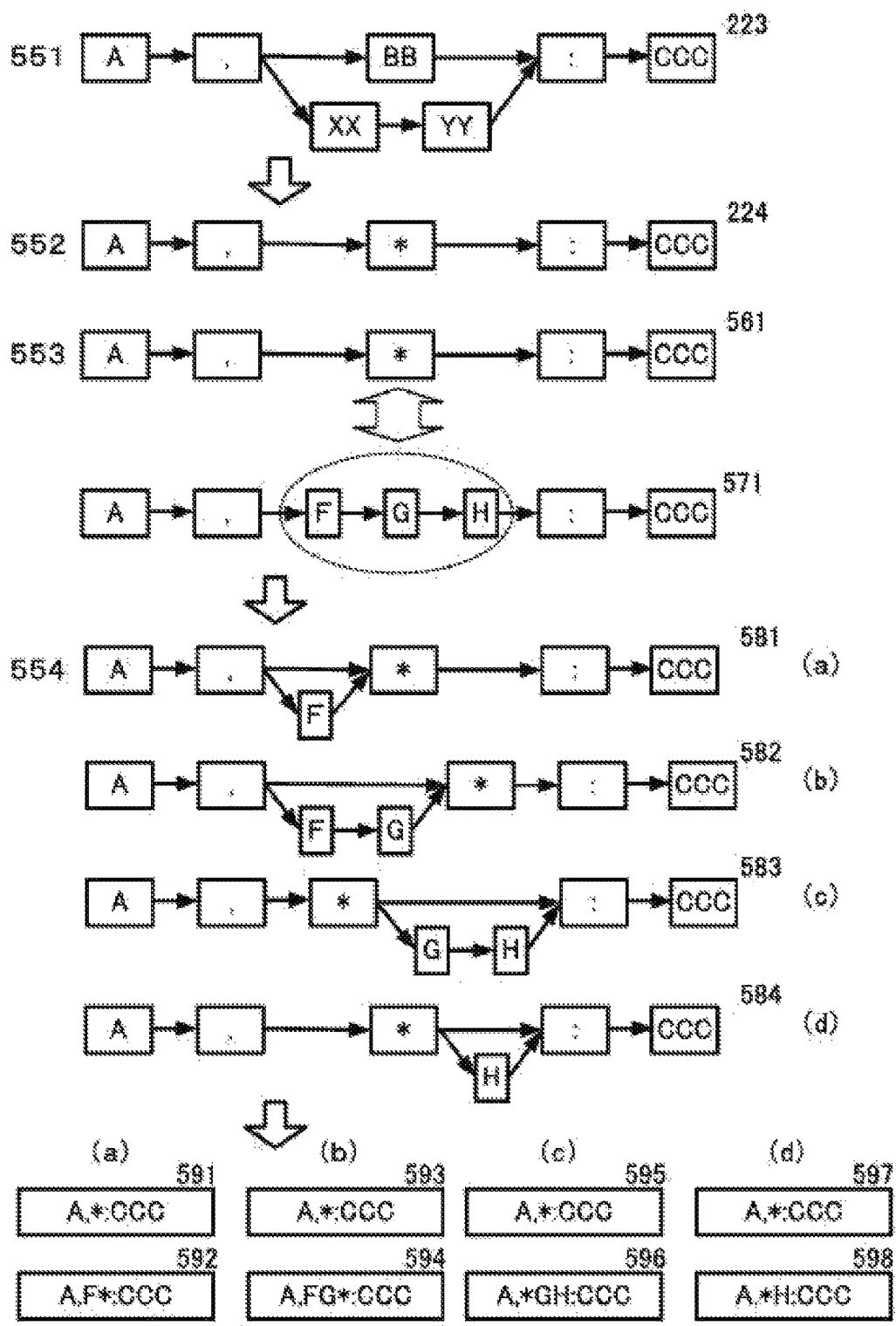
FIG. 5D is a diagram for detecting nodes which have similar appearance tendencies of character strings in a process for estimating a format from a log message according to an embodiment of the present invention.

FIG. 5D is a diagram for detecting nodes having similar appearance tendencies of character strings in a process for estimating a format from a log message according to an embodiment of the present invention.

A directed graph structure (223) illustrated in step 551 is the same as that created through the processing illustrated in steps 201 to 203 of FIG. 2. Therefore, a method for creating the directed graph structure (223) should be referred to the explanation for steps 201 to 203 in FIG. 2.

In step 551, in accordance with the integration between the two directed graph structures, the computer (101) determines whether the appearance tendency is similar between a character string in the main node "BB" and character strings in the branch node "XX" and the node "YY" in a closed path of the directed graph structure (223) that includes a branch node. In accordance with a similar appearance tendency between the character string in the main node "BB" and the character strings in the branch nodes "XX" and "YY", the computer (101) integrates the main node "BB" and the branch nodes "XX" and "YY" into one node. Then, the computer (101) provides the integrated node with an asterisk (*) representing an arbitrary character string as a character string included in the integrated node, and creates a directed graph structure (224).

In step 552, the computer (101) outputs the directed graph structure (224) as an automaton (561), and stores the automaton (561) into, for example, a storage medium (for example, the storage device (108) illustrated in FIG. 1) in which an automaton is stored.

In step 553, similar to step 201 and step 202 which are illustrated as steps 201 to 202 in FIG. 2, the computer (101) acquires a log message (not illustrated) "A,F G H:CCC" (there is a blank character between "F" and "G" and between "G" and "H") from, for example, a storage medium (for example, the storage device (108) illustrated in FIG. 1) in which log messages are stored, and divides the acquired log message by predetermined characters (for example, signs or blank characters). The acquired log message is divided by predetermined characters into character strings: "A", ",", "F", "G", "H", ":", and "CCC". The computer (101) creates a directed graph structure (571) for the acquired log message by arranging nodes which represent the divided character strings in order from the beginning of the acquired log message.

Then, the computer (101) compares nodes in the automaton (561) with nodes in the directed graph structure (571) to determine whether a node in the directed graph structure (571) corresponds to a node in the automaton (561). By the above comparison, the computer (101) detects that the nodes "A", ",", ":", and "CCC" are corresponding nodes. Furthermore, by the above comparison, the computer (101) detects that the nodes ("F", "G", and "H") in the directed graph structure (571) do not correspond to the node "*" in the automaton (561). Next, the computer (101) determines whether the appearance tendency is similar between the character strings in the nodes ("F", "G", and "H") in the directed graph structure (571) and the character string in the node ("*") in the automaton (561). The computer (101)

determines whether the appearance tendency is similar between the character strings ("F", "G", and "H") and the character string "*", for example, not only by defining the character string "*" as an arbitrary character string but also in accordance with, for example, the character type, the character length, or the character editing distance of the character strings ("BB", "XX", and "YY") before being integrated into the character string "*". In accordance with a similar appearance tendency, the computer (101) is able to consider that the character strings in the nodes ("F", "G", and "H") in the directed graph structure (571) and the character string in the node ("*") in the automaton (561) correspond to each other. In contrast, in accordance with a different appearance tendency, the computer (101) is able to consider that the character strings in the nodes ("F", "G", and "H") in the directed graph structure (571) and the character string in the node ("*") in the automaton (561) do not correspond to each other.

Furthermore, in accordance with a node in the directed graph structure (571) corresponding to a node in the automaton (561), the computer (101) does not change the directed graph structure (224). In contrast, in accordance with a node in the directed graph structure (571) not corresponding to a node in the automaton (561), the computer (101) proceeds to processing for adding to the directed graph structure (224) the different node as a branch node.

In the case where a node in the directed graph structure (571) does not correspond to a node in the automaton (561), the computer (101) generates the four types of directed graph structures (581, 582, 583, and 584) explained below, in accordance with the different node.

The directed graph structure (581) is generated from the directed graph structure (224) in the case where the nodes "A", ",", ":", and "CCC" in the automaton (561) correspond to corresponding nodes in the directed graph structure (571) and the appearance frequency is similar between the character string in the node "*" in the automaton (561) and the character strings in the nodes "G" and "H" in the directed graph structure (571), and the branch node "F" is a node other than those having a similar appearance frequency of character string.

The directed graph structure (582) is generated from the directed graph structure (224) in the case where the nodes "A", ",", ":", and "CCC" in the automaton (561) correspond to corresponding nodes in the directed graph structure (571) and the appearance frequency is similar between the character string in the node "*" in the automaton (561) and the character string in the node "H" in the directed graph structure (571), and the branch nodes "F" and "G" are nodes other than those having a similar appearance frequency of character string.

The directed graph structure (583) is generated from the directed graph structure (224) in the case where the nodes "A", ",", ":", and "CCC" in the automaton (561) correspond to corresponding nodes in the directed graph structure (571) and the appearance frequency is similar between the character string in the node "*" in the automaton (561) and the character string in the node "F" in the directed graph structure (571), and the branch nodes "G" and "H" are nodes other than those having a similar appearance frequency of character string.

The directed graph structure (584) is generated from the directed graph structure (224) in the case where the nodes "A", ",", ":", and "CCC" in the automaton (561) correspond to corresponding nodes in the directed graph structure (571) and the appearance frequency is similar between the character string in the node "*" in the automaton (561) and the character strings in the nodes "F", and "G" in the directed graph structure (571), and the branch node "H" is a node other than those having a similar appearance frequency of character string.

In step 554, the computer (101) estimates one or more formats, based on the directed graph structure (581, 582, 583, or 584). Hereinafter, the case where two formats are estimated, based on the directed graph structure (581, 582, 583, or 584), will be explained.

A format (591) estimated based on the directed graph structure (581) includes the nodes "A" and "," which include corresponding character strings, the node "*" which has a similar appearance tendency of character string, and the nodes ":" and "CCC" which include corresponding character strings. A format (592) estimated based on the directed graph structure (581) includes the nodes "A" and "," which include corresponding character strings, the node "F" which includes a different character string and which is a node other than those having a similar appearance tendency of character string, the node "*" which has a similar appearance tendency of character string, and the nodes ":" and "CCC" which include corresponding character strings.

A format (593) estimated based on the directed graph structure (582) includes the nodes "A" and "," which include corresponding character strings, the node "*" which has a similar appearance tendency of character string, and the nodes ":" and "CCC" which include corresponding character strings. A format (594) estimated based on the directed graph structure (582) includes the nodes "A" and "," which include corresponding character strings, the nodes "F" and "G" which include different character strings and which are nodes other than those having a similar appearance tendency of character string, the node "*" which has a similar appearance tendency of character string, and the nodes ":" and "CCC" which include corresponding character strings.

A format (595) estimated based on the directed graph structure (583) includes the nodes "A" and "," which include corresponding character strings, the node "*" which has a similar appearance tendency of character string, and the nodes ":" and "CCC" which include corresponding character strings. A format (596) estimated based on the directed graph structure (583) includes the node "A" which includes a corresponding character string, the node "*" which has a similar appearance tendency of character string, the nodes "G" and "H" which include different character strings and which are nodes other than those having a similar appearance tendency of character string, and the nodes ":" and "CCC" which include corresponding character strings.

A format (597) estimated based on the directed graph structure (584) includes the nodes "A" and "," which include corresponding character strings, the node "*" which has a similar appearance tendency of character string, and the nodes ":" and "CCC" which include corresponding character strings. A format (598) estimated based on the directed graph structure (584) includes the nodes "A" and "," which include corresponding character strings, the node "*" which has a similar appearance tendency of character string, the node "H" which includes a different character string and which is a node other than those having a similar appearance tendency of character string, and the nodes ":" and "CCC" which include corresponding character strings.

Figure 6A:
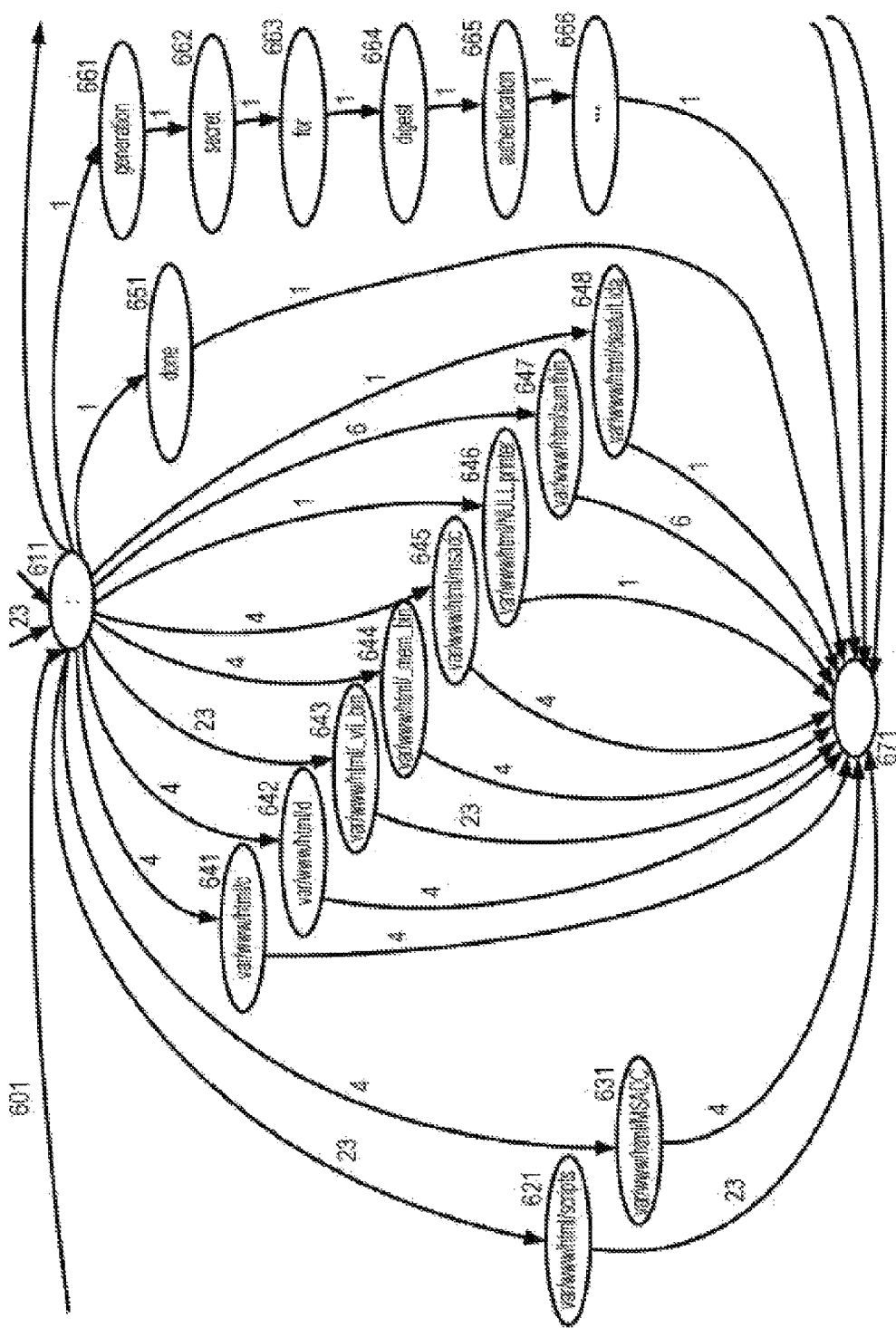
FIG. 6A illustrates a log message which is visualized as a directed graph structure according to an embodiment of the present invention.

FIG. 6A illustrates a log message which is visualized as a directed graph structure according to an embodiment of the present invention.

A directed graph structure (601) is a part of a directed graph structure obtained after directed graph structures created from a plurality of log messages are integrated at nodes including corresponding character strings according to an embodiment of the present invention. However, the directed graph structure (601) is in a state in which integration of nodes having similar appearance tendencies of character strings is not performed. In the directed graph structure (601), for example, a number 23 on the edge from the node (611) to the node (621) represents that 23 directed graph structures including a path from the node (611) to the node (621) are integrated together.

In the directed graph structure (601), the node (611) is an origin node of a closed path, the node (671) is a terminal node of the closed path, and the closed path includes a plurality of closed paths. In the directed graph structure (601), each of the nodes (621, 631, and 641 to 648) is a node on a path from an origin node to a terminal node based on a log message including a URL. In the directed graph structure (601), a node (651) is a node on a path from an origin node to a terminal node based on an error message of the system. In the directed graph structure (601), nodes (661 to 666) are a plurality of nodes on a path from an origin node to a terminal node based on an error message of the system. As described above, in the directed graph structure (601), a log message is divided by predetermined characters so that one or more different number of nodes exist on each path from an origin node to a terminal node.

Figure 6B:
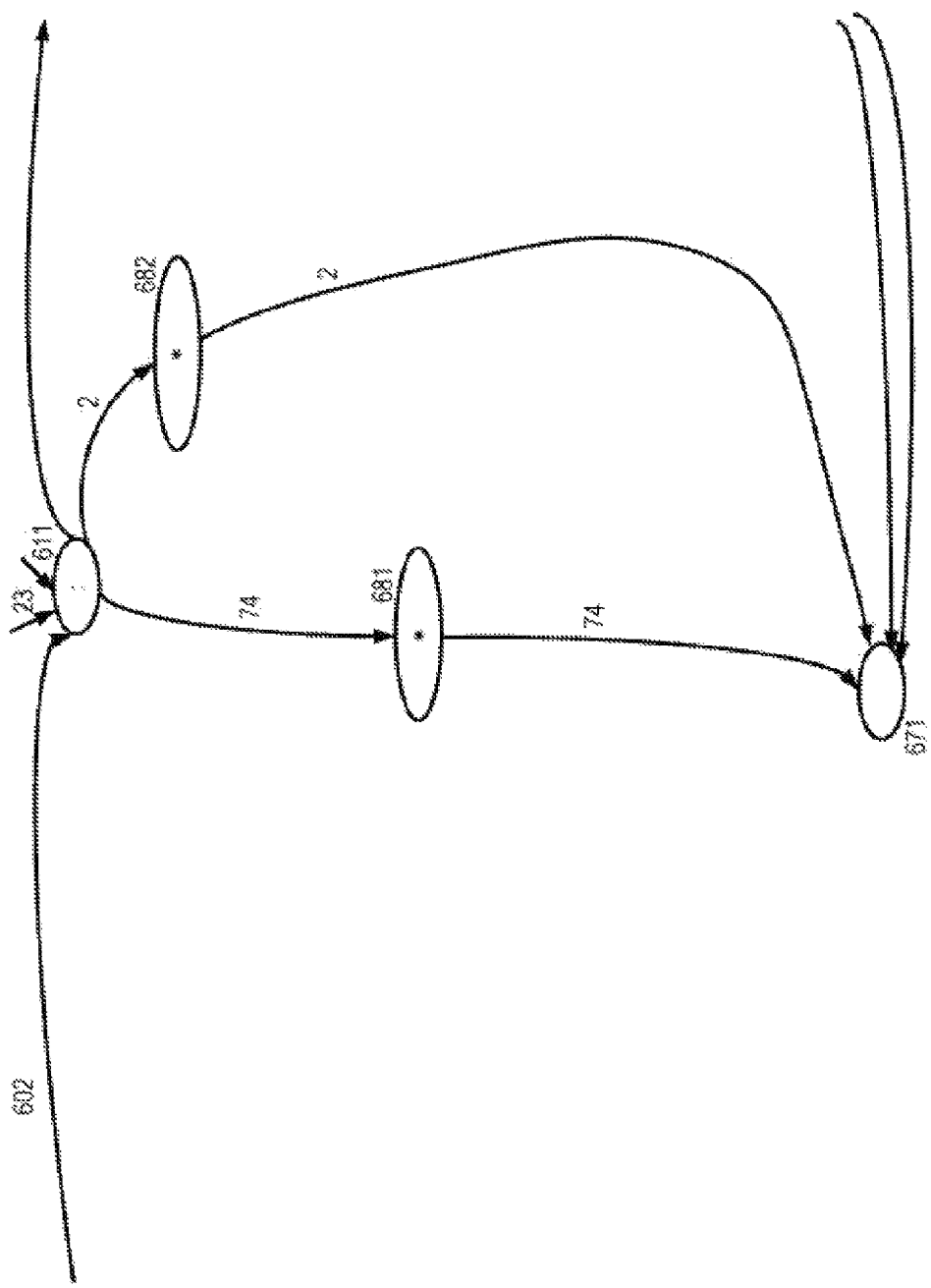
FIG. 6B illustrates an example of a directed graph structure obtained after the directed graph structure illustrated in FIG. 6A is simplified according an embodiment of the present invention.

FIG. 6B illustrates an example of a directed graph structure obtained after nodes having similar appearance tendencies of character strings are integrated together and simplified in the directed graph structure illustrated in FIG. 6A according to an embodiment of the present invention.

In the directed graph structure (602), a node (681) is a node obtained after the ten nodes (621, 631, and 641 to 648) illustrated in FIG. 6A are integrated together as nodes having similar appearance tendencies of character strings, and the node (682) is a node obtained after the seven nodes (651 and 661 to 666) illustrated in FIG. 6A are integrated together as nodes having similar appearance tendencies of character strings.

Figure 7A:
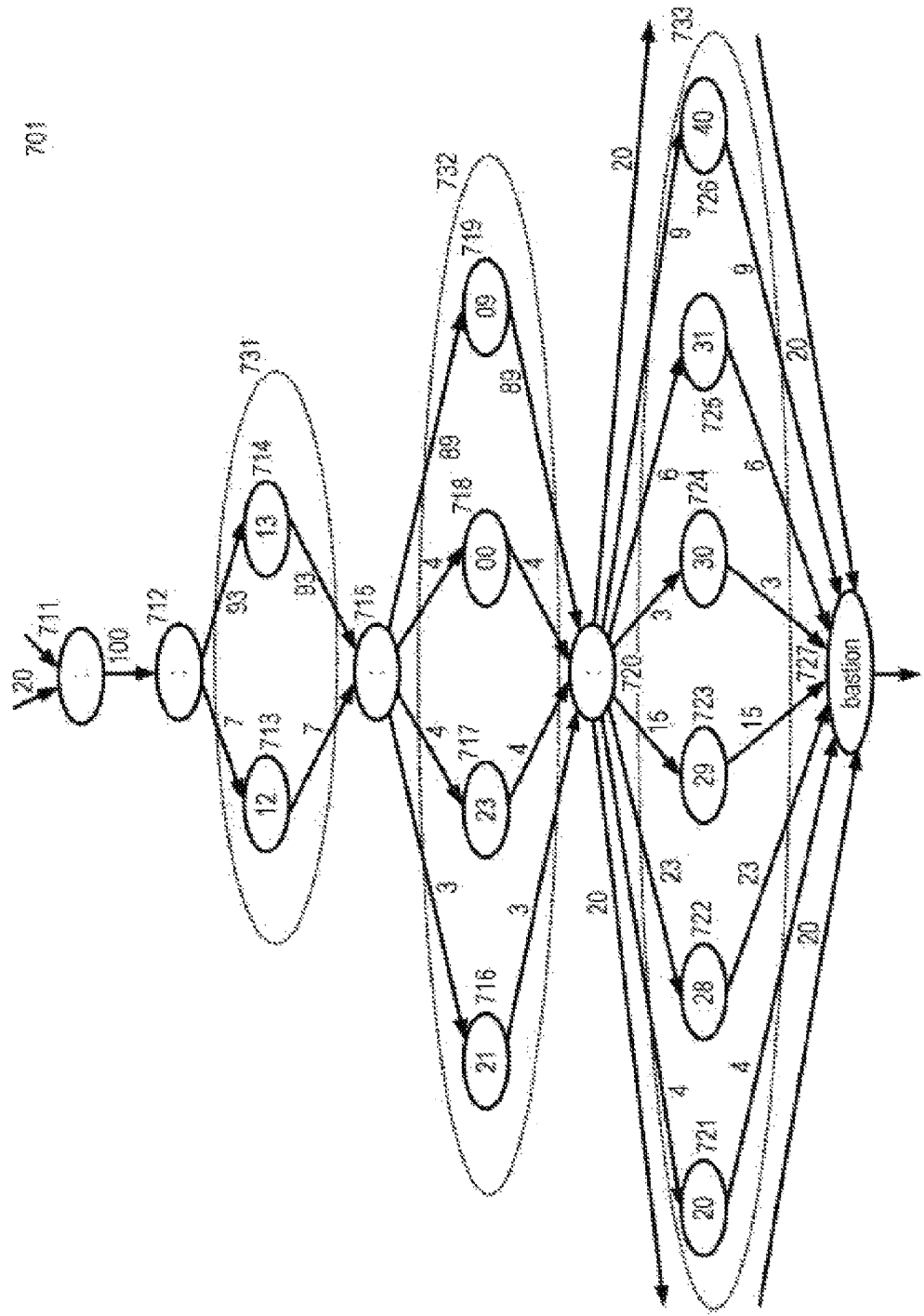
FIG. 7A illustrates a log message which is visualized as a directed graph structure according to an embodiment of the present invention.

FIG. 7A illustrates a log message which is visualized as a directed graph structure according to an embodiment of the present invention.

A directed graph structure (701) is a part of a directed graph structure obtained after directed graph structures created from a plurality of log messages are integrated at nodes including corresponding character strings according to an embodiment of the present invention. However, the directed graph structure (701) is in a state in which integration of nodes having similar appearance tendencies of character strings is not performed.

The directed graph structure (701) is obtained by visualizing "Feb 25 XX:XX:XX" (XX represents a variable numerical value), which is a part of a log message, as a directed graph structure.

The directed graph structure (701) includes three closed paths (731, 732, and 733). The closed path (731) includes an origin node (712) and a terminal node (715) and includes nodes (713 and 714) on individual paths from the origin node (712) to the terminal node (715). The closed path (732) includes an origin node (715) and a terminal node (720) and includes nodes (716, 717, 718, and 719) on individual paths from the origin node (715) to the terminal node (720). The closed path (733) includes an origin node (720) and a terminal node (727) and includes nodes (721, 722, 723, 724, 725, and 726) on individual paths from the origin node (720) to the terminal node (727).

Figure 7B:
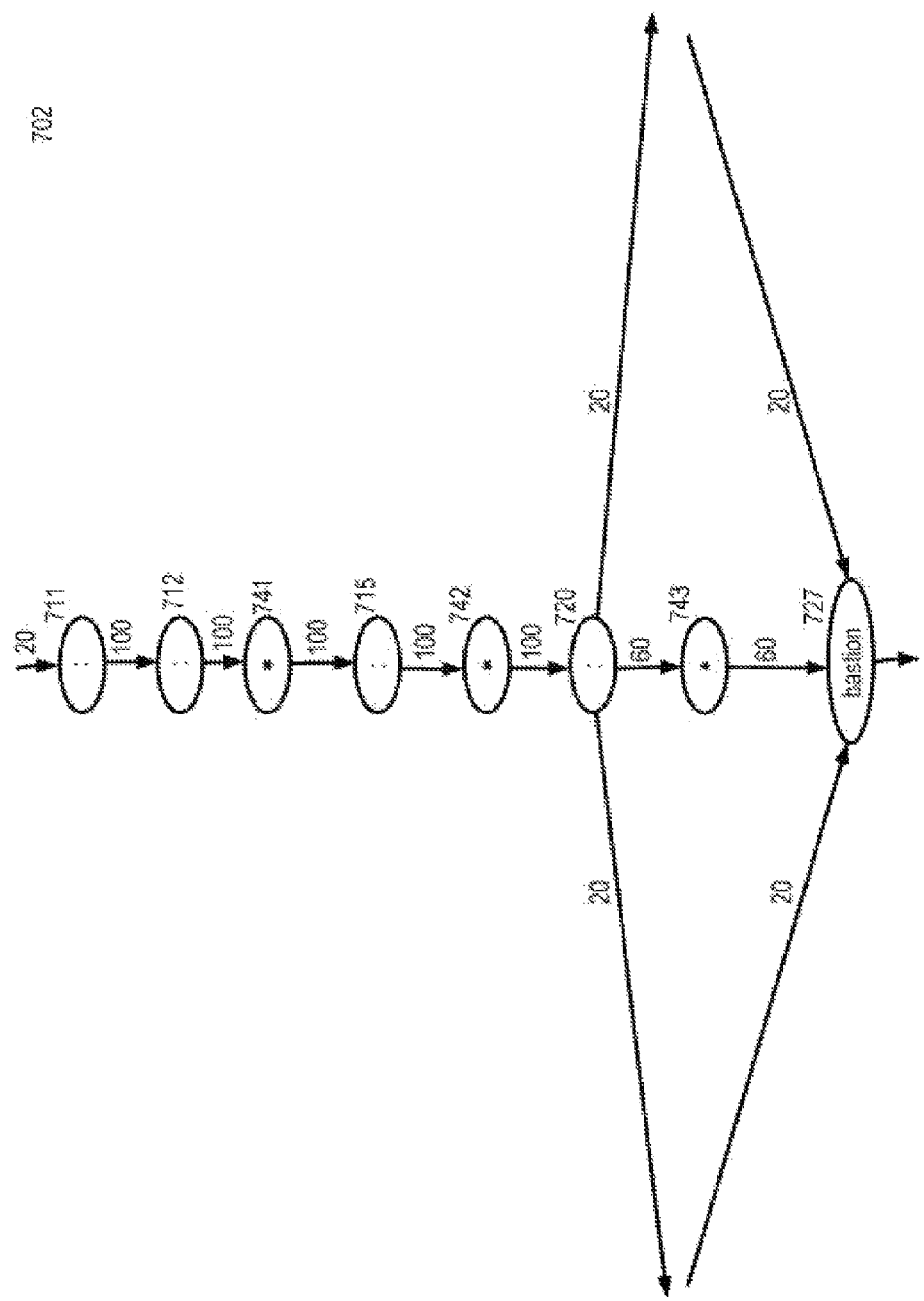
FIG. 7B illustrates an example of a directed graph structure obtained after the directed graph structure illustrated in FIG. 7A is simplified according to an embodiment of the present invention.

FIG. 7B illustrates an example of a directed graph structure obtained after nodes having similar appearance tendencies of character strings are integrated together and simplified in the directed graph structure illustrated in FIG. 7A according to an embodiment of the present invention.

In the directed graph structure (702), the node (741) is a node obtained after the two nodes (713 and 714) illustrated in FIG. 7A are integrated together as nodes having similar appearance tendencies of character strings, the node (742) is a node obtained after the four nodes (716, 717, 718, and 719) illustrated in FIG. 7A are integrated together as nodes having similar appearance tendencies of character strings, and the node (743) is a node obtained after the six nodes (721, 722, 723, 724, 725, and 726) illustrated in FIG. 7A are integrated together as nodes having similar appearance tendencies of character strings.

Figure 8A:
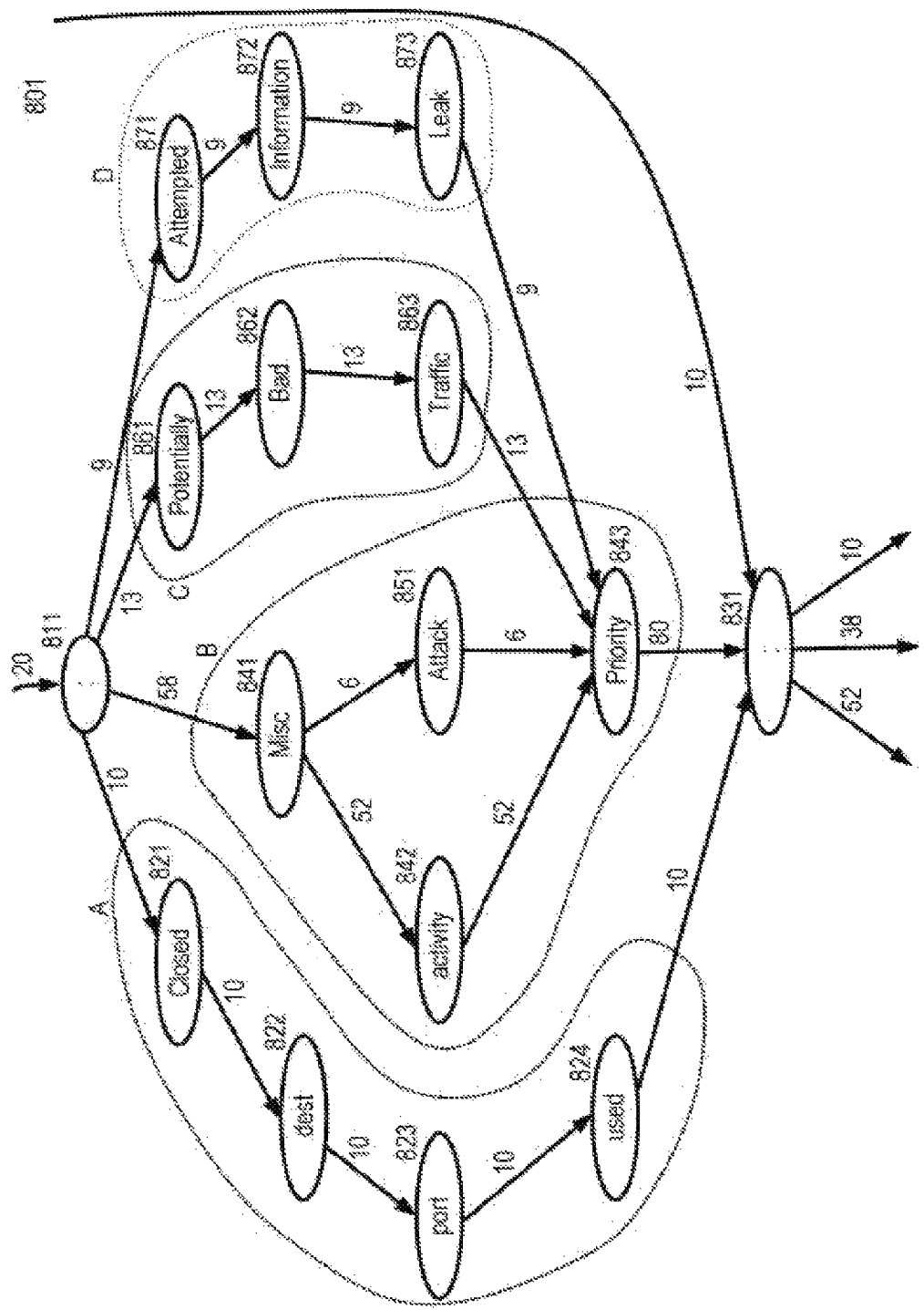
FIG. 8A illustrates a log message which is visualized as a directed graph structure according to an embodiment of the present invention.

FIG. 8A illustrates a log message which is visualized as a directed graph structure according to an embodiment of the present invention.

A directed graph structure (801) is a part of a directed graph structure obtained after directed graph structures created from a plurality of log messages are integrated at nodes including corresponding character strings according to an embodiment of the present invention. However, the directed graph structure (801) is in a state in which integration of nodes having similar appearance tendencies of character strings is not performed.

The directed graph structure (801) illustrates that in the case where a log message includes a natural language, when a plurality of the same output contents are output even if they are based on the natural language, nodes are separated. Furthermore, in the directed graph structure (801), portions (A, B, C, and D) expressed by dotted lines represent consecutive node groups on individual paths.

Figure 8B:
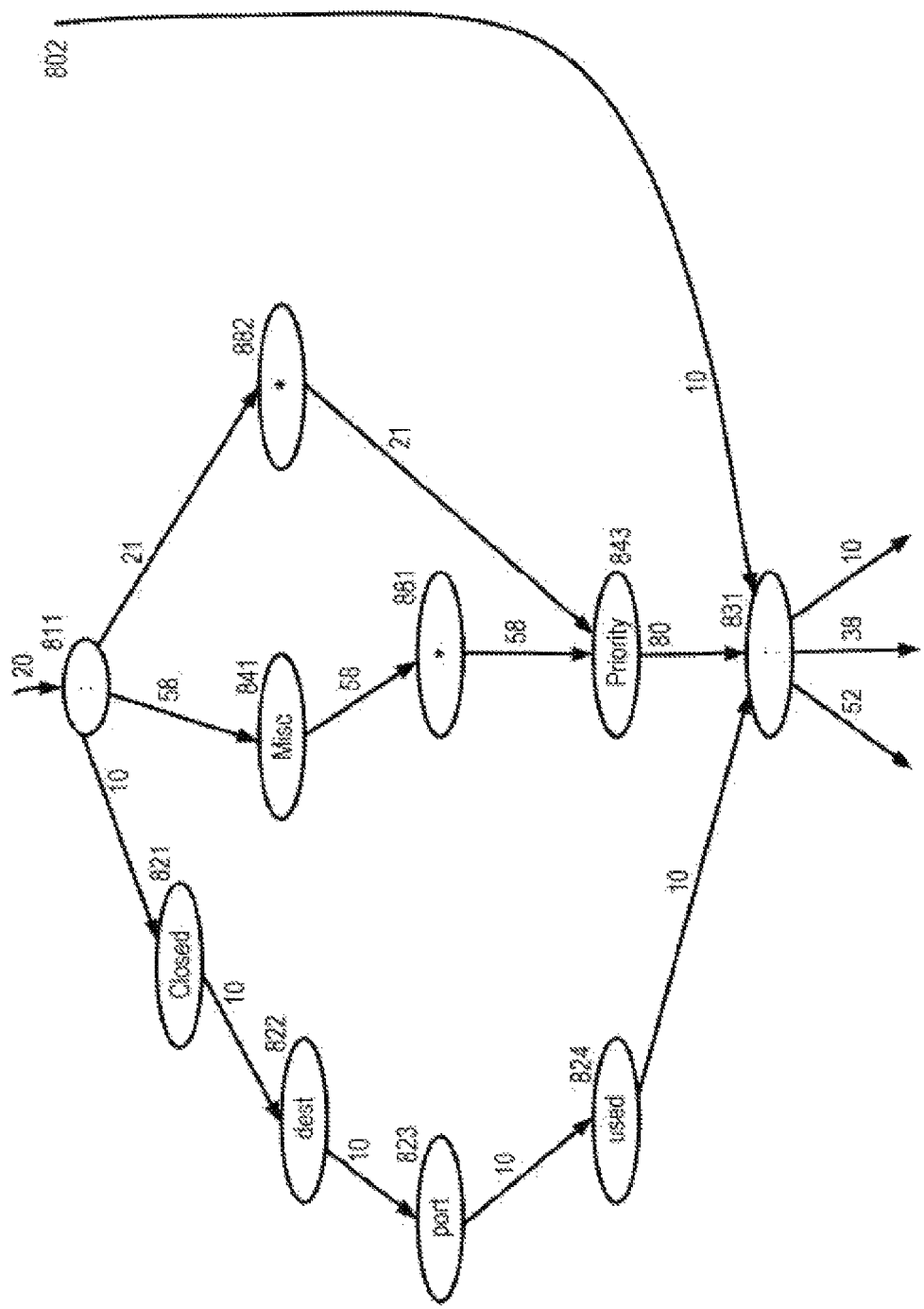
FIG. 8B illustrates an example of a directed graph structure obtained after the directed graph structure illustrated in FIG. 8A is simplified according to an embodiment of the present invention.

FIG. 8B illustrates an example of a directed graph structure obtained after nodes having similar appearance tendencies of character strings are integrated together and simplified in the directed graph structure illustrated in FIG. 8A according to an embodiment of the present invention.

In the directed graph structure (802), the node (881) is a node obtained after the two nodes (842 and 851) illustrated in FIG. 8A are integrated together as nodes having similar appearance frequencies of character strings, and the node (881) is a node obtained after the six nodes (861, 862, 863, 871, 872, and 873) illustrated in FIG. 8A are integrated together as nodes having similar appearance frequencies of character strings.

Figure 9A:
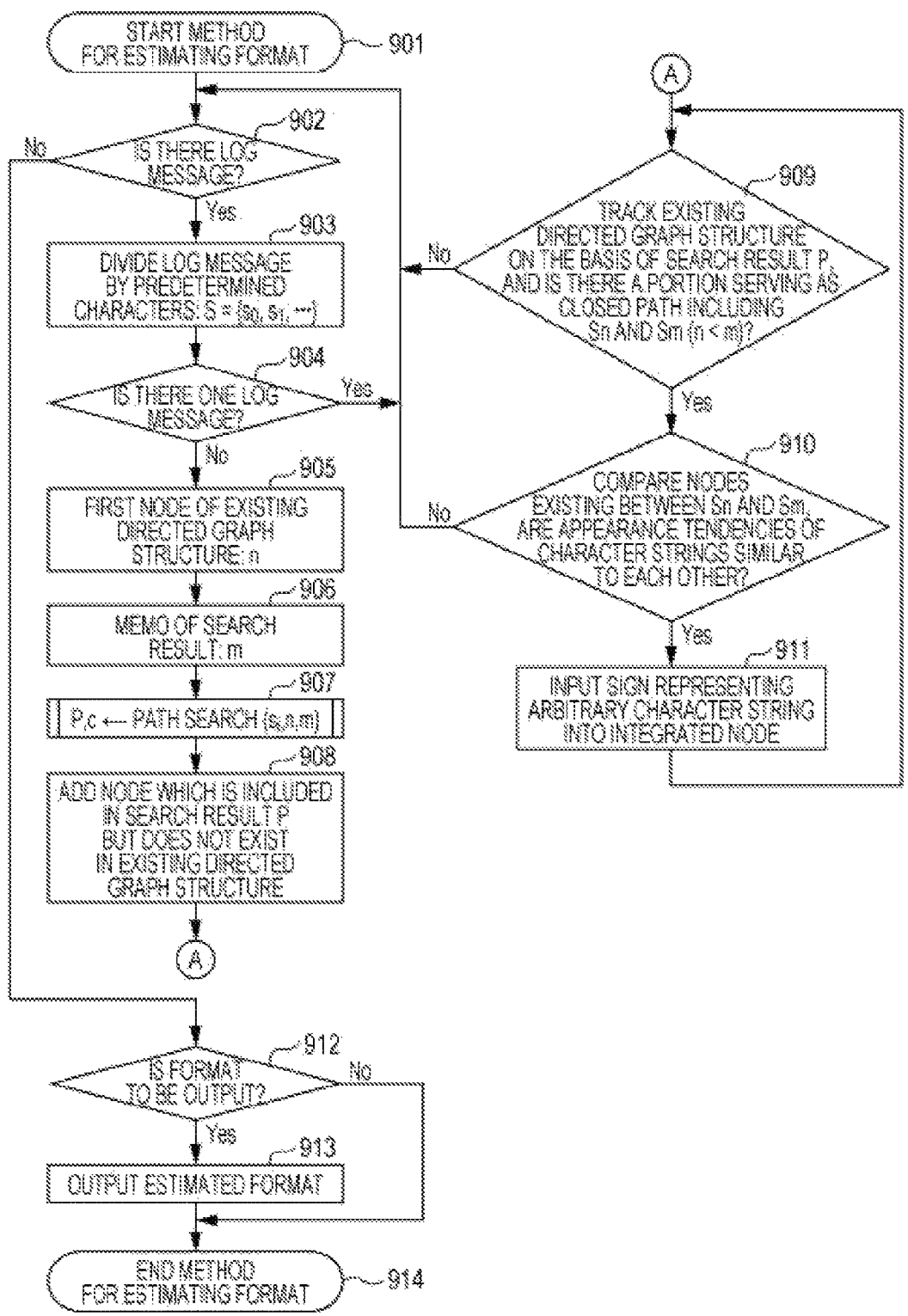
FIG. 9A is a flowchart illustrating a process for estimating a format from a log message according to an embodiment of the present invention.
Figure 9B:
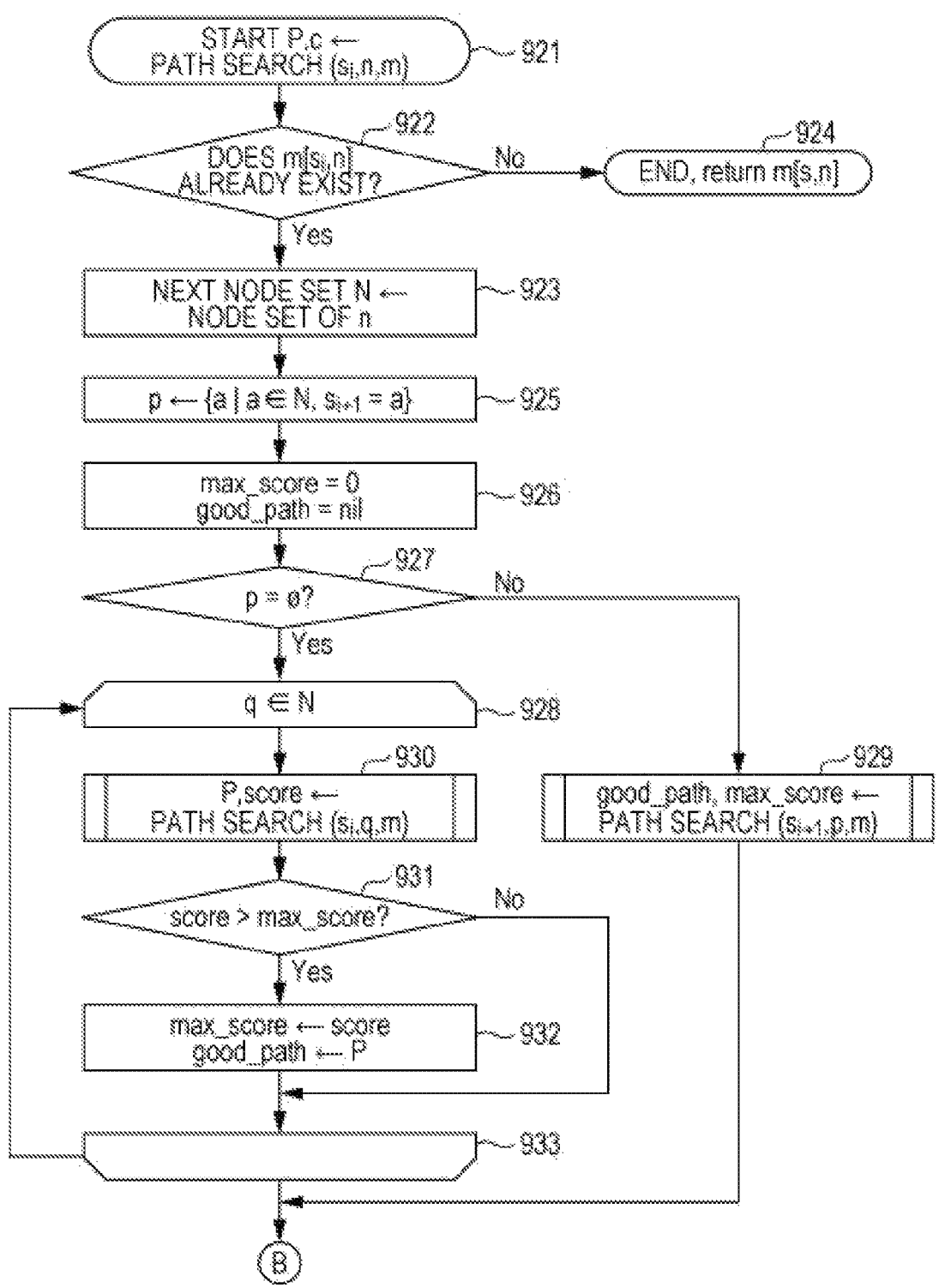
FIG. 9B is a flowchart illustrating the details of processing of the path search in the flowchart illustrating in FIG. 9A.
Figure 9C:
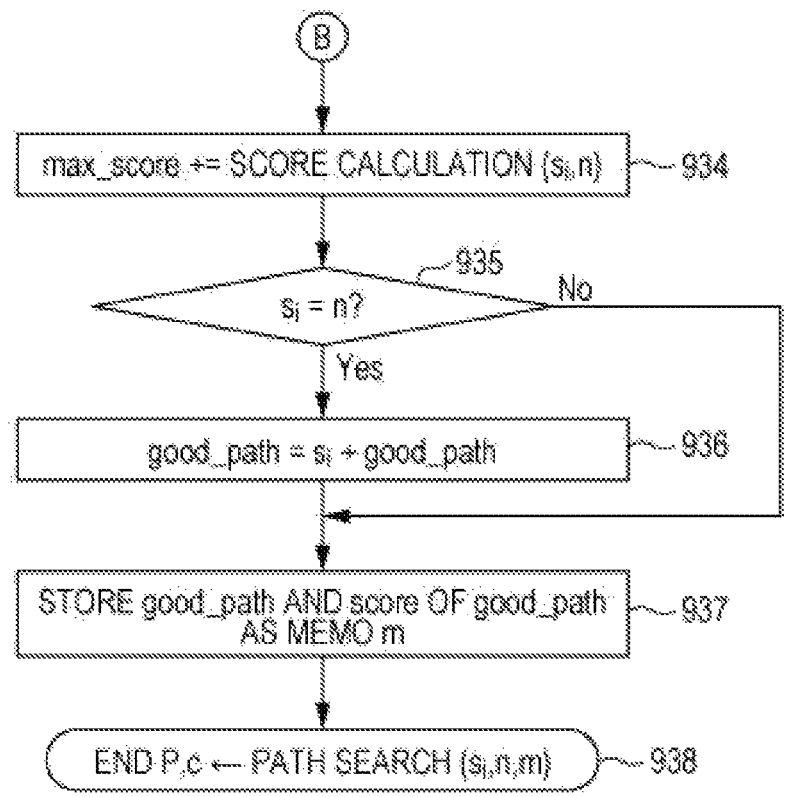
FIG. 9C is a flowchart illustrating the details of the processing of the path search in the flowchart illustrating in FIG. 9A.

FIGS. 9A to 9C are flowcharts illustrating processes for estimating a format from a log message according to an embodiment of the present invention.

FIG. 9A is a main flowchart for a process for estimating a format from a log message.

In step 901, the computer (101) starts the process for estimating a format from a log message.

In step 902, the computer (101) determines whether there is a remaining log message to be input. In accordance with the presence of a remaining log message to be input, the computer (101) proceeds the process to step 903. In contrast, in accordance with the absence of a remaining log message to be input, the computer (101) proceeds the process to step 912.

The computer (101) acquires the log message, for example, from a storage medium (for example, the storage device (108) illustrated in FIG. 1) in which log messages are stored or from an application on which log messages are generated.

In step 903, the computer (101) divides the log message input in step 902 by predetermined characters. The predetermined characters includes, for example, signs or blank characters. The signs are for example, "[", "]", "(", ")", """, ":", ";", "=", ">", and "<" (may be two-byte or one-byte characters). However, the signs are not limited to the above examples. The blank characters are, for example, two-byte or one-byte space characters.

The divided log message is expressed as, for example, an expression: $S=[s_0, s_1, \ldots]$. In this expression, individual portions are expressed as $\{s_0\}$, $\{s_1\}$], and so on. Character strings in the individual portions include, for example, an alphabetical character, a number, or a two-byte character (for example, a Chinese character, a hiragana character, or a katakana character). Furthermore, each of the portions includes one or more character strings.

The computer (101) creates a directed graph structure by arranging nodes which represent the divided portions $\{s_0\}$, $\{s_1\}$, and so on of the log message in order from the beginning of the log message. When creating the above directed graph structure, the computer (101) treats the predetermined characters as nodes in the directed graph structure or excludes the predetermined characters without treating them as nodes in the directed graph structure. For example, a user of the log message is able to select, in a desired manner, whether or not, for example, the computer (101) should treat a blank character as a node. The computer (101), for example, stores the created directed graph structure into, for example, a storage medium (for example, the storage device (108) illustrated in FIG. 1) or the memory (103) in which a directed graph structure is stored.

In step 904, the computer (101) determines whether only one log message has been received. In accordance with reception of more than one log messages, the computer (101) proceeds the process to step 904. In contrast, in accordance with reception of only one log message, the computer (101) returns the process to step 902 and waits for the next (that is, the second or later) log message to be received.

In step 905, the computer (101) reads the existing directed graph structure from, for example, a storage medium (for example, the storage device (108) or the memory (103) illustrated in FIG. 1) in which a directed graph structure is stored. Then, the computer (101) reads the first node n in the read existing directed graph structure.

In step 906, in accordance with a memo m representing a search result created by using the memorizing recursion technique being stored in, for example, a storage medium (for example, the storage device (108) or the memory (103) illustrated in FIG. 1) in which a memo m of a search result is stored, the computer (101) reads the memo m from the storage medium.

In step 907, the computer (101) determines, based on a function P, $c \leftarrow$path search $(s_i, n, m)$, which path in the directed graph structure is to be passed through in order to search for nodes that correspond to each other. The computer (101) refers to the memo m using $s_i$ and n as keys, and examines whether a node represented by $s_i$ has already been searched for.

P represents a search result P.

c represents a score indicating which path is to be passed through. The score represents a parameter described in accordance with a return value of the processing of step 938 illustrated in FIG. 9C mentioned below being binary and will not be substantially used later.

$s_i$ represents a node in the directed graph structure created from the log message input in step 902 and represents a node which is currently being examined.

n represents a node in the existing directed graph structure read in step 905 and represents a node which is currently being examined.

m represents a memo m of a search result.

The details of the processing of step 907 will be explained separately in accordance with the flowcharts illustrated in FIGS. 9B and 9C.

In step 908, the computer (101) compares nodes in the directed graph structure created in step 903 with nodes in the existing directed graph structure to detect a node in the directed graph structure created in step 903 and a node in the existing directed graph structure that are nodes other than those including a corresponding character string. Then, the computer (101) adds the detected node as a branch node to the existing directed graph structure. That is, the computer (101) adds, as a branch node, a node which is included in the search result P but does not exist in the existing directed graph structure to the existing directed graph structure.

In step 909, the computer (101) tracks the directed graph structure created in step 903 based on the search result P, searches for a portion serving as a closed path including Sn and Sm (here, n<m) of the nodes in the directed graph structure, and determines whether the portion serving as a closed path exists. At the time of this search, since the existing directed graph structure includes a portion corresponding to a node in the directed graph structure created in step 903, it is possible to consider the search as being equal to tracking the existing directed graph structure and searching for a portion serving as a closed path including Sn and Sm (here, n <m) of the nodes in the existing directed graph structure. The Sn corresponds to an origin node of a closed path and the Sm corresponds to a terminal node of the closed path. In the search for a portion serving as a closed path, the computer (101) searches for a subgraph and a path including the largest number of partially corresponding nodes in different nodes. Furthermore, when there are a plurality of portions serving as closed paths, the computer (101) searches for closed paths in order from a smaller closed path included in the plurality of closed paths. In accordance with the presence of a portion serving as a closed path, the computer (101) proceeds the process to step 910. In contrast, in accordance with the absence of a portion serving as a closed path, the computer (101) returns the process to step 902.

In step 910, the computer (101) compares nodes existing between the Sn and the Sm in the closed path found in step 909 to determine whether the appearance tendency of character string is similar between the nodes. In accordance with a similar appearance tendency of character string between the nodes, the computer (101) proceeds the process to step 911. In contrast, in accordance with a different appearance tendency of character string between the nodes, the computer (101) returns the process to step 902.

In step 911, the computer (101) integrates the nodes for which it is determined in step 910 that the appearance tendencies of character strings are similar into one node. Then, the computer (101) adds a sign representing an arbitrary character string (for example, may be a wildcard and, for example, a question mark (?) or asterisk (*)) to the integrated node. The computer (101) recursively performs the processing of step 909 to step 911 until there is no remaining closed path.

In step 912, the computer (101) determines whether or not to estimate a format, based on a directed graph structure. In accordance with the determination that the format is to be estimated, the computer (101) proceeds the process to step

913. In accordance with the determination that the format is not to be estimated, the computer (101) proceeds the process to step 914.

In step 913, the computer (101) estimates a format, for example, by scanning a path passing from an origin node to a terminal node in the directed graph structure, based on the directed graph structure. The estimated format includes a first portion (a character string) associated with a node including a corresponding character string, a second portion (a character string) associated with a node which has a similar appearance tendency of character string, and, optionally, a third portion (a character string) associated with a node other than those having a similar appearance tendency of character string.

In step 914, the computer (101) ends the process for estimating a format from a log message.

FIGS. 9B to 9C are flowcharts illustrating the details of the processing (907) of the path search in the flowchart illustrated in FIG. 9A.

In step 921, the computer (101) starts the process for the path search illustrated as step 907.

In step 922, the computer (101) determines whether a memo m[$s_i$, n] regarding a comparison between a node in the directed graph structure created from the log message input in step 902 and a node in the existing directed graph structure read in step 905 already exists. In accordance with the already existing memo m[$s_i$, n], the computer (101) proceeds the process to step 923. In contrast, in accordance with the absence of the memo m[$s_i$, n], the computer (101) proceeds the process to step 923.

In step 923, in accordance with the absence of the memo m[$s_i$, n], the computer (101) defines the next node set which exists next to the node n in the existing directed graph structure read in step 905 as a node set N.

In step 924, since the memo m[s, n] already exists as a memo, the computer (101) returns the value of the memo m[s, n] as an output and ends the process for path search illustrated as step 907. Then, the computer (101) proceeds the process to step 908 illustrated in FIG. 9A.

In step 925, the computer (101) searches the node set N in the existing directed graph structure read in step 905 for the next node $s_{i+1}$, which is the node next to the node $s_i$ in the directed graph structure created from the log message input in step 902 (P←{a|a∈N, $s_{i+1}$=a}).

In step 926, the computer (101) performs initialization by substituting 0 into max_score and substituting nil (null) into good_path.

In step 927, the computer (101) determines whether p is equal to φ (that is, a node which satisfies P←{a|a∈N, $s_{i+1}$=a} illustrated as step 925 does not exist). φ represents a general empty set. In accordance with p being equal to φ (that is, p corresponds to φ), the computer (101) proceeds the process to step 930. In contrast, in accordance with p being not equal to φ (that is, p does not correspond to φ), the computer (101) proceeds the process to step 929.

In step 928, the computer (101) acquires a node q from the next set N (q∈N). The next node in the existing directed graph structure is substituted into q.

In step 929, in order to search for which two nodes correspond to each other, the computer (101) repeatedly performs path search for the next node using a function ($s_{i+1}$, p, m) (here, return values are substituted into good_path instead of p and into max_score instead of c) in a recursive manner, and outputs good_path and max_score as return values.

In step 930, in order to search for which two nodes correspond to each other, the computer (101) determines, based on a path search function P, score←path search ($s_i$, q, m) (here, the left side of the path search has a path as a first value and a score variable as a second value), which path is to be passed through in the directed graph structure. A score is set to be a large value when nodes correspond to each other, whereas the score is set to be a smaller value when the appearance frequencies are similar to each other.

In step 931, the computer (101) determines whether the score obtained in step 930 is larger than max_score. In accordance with the score being larger than max_score, the computer (101) proceeds the process to step 932. In contrast, in accordance with the score being smaller than or equal to max_score, the computer (101) proceeds the process to step 933.

In step 932, the computer (101) substitutes the score obtained in step 930 into max_score and substitutes the search result P obtained in step 930 into good_path.

In step 933, the computer (101) searches for the next node in the existing directed graph structure to obtain the score of the next node, and repeats the processing of step 928 to step 932 to search for the node having the maximum score. That is, the computer (101) performs examination by inputting all the elements q included in the node set N in order into the path search function and searches for the path having the maximum score. As described above, the computer (101) examines the most appropriate route in the existing directed graph structure through which the node in the directed graph structure created from the log message input in step 902 is to pass.

In step 934, the computer (101) performs max_score+=score calculation ($s_i$, n). That is, the computer (101) adds a score in order to search for the path having the maximum score in the process of searching for a path in the existing directed graph structure through which the node in the directed graph structure created from the log message input in step 902 is to pass.

In step 935, the computer (101) determines whether $s_i$ is equal to n. That is, the computer (101) determines whether character strings of $s_i$ and n correspond to each other. In accordance with $s_i$ being equal to n, the computer (101) proceeds the process to step 936. In contrast, in accordance with $s_i$ being not equal to n, the computer (101) proceeds the process to step 937.

In step 936, the computer (101) collects a set of sequences of nodes including corresponding character strings based on good_path=$s_i$+good_path. That is, the computer (101) connects paths to store the optimal path in good_path. good_path represents a set of sequences of nodes including corresponding character strings.

In step 937, the computer (101) records good_path and the score of the good_path obtained in step 936 as a memo m in a storage medium in which a memo m is stored.

In step 938, the computer (101) ends the process for the path search illustrated as step 907. Then, the computer (101) proceeds the process to step 908 illustrated in FIG. 9A.

Figure 10:
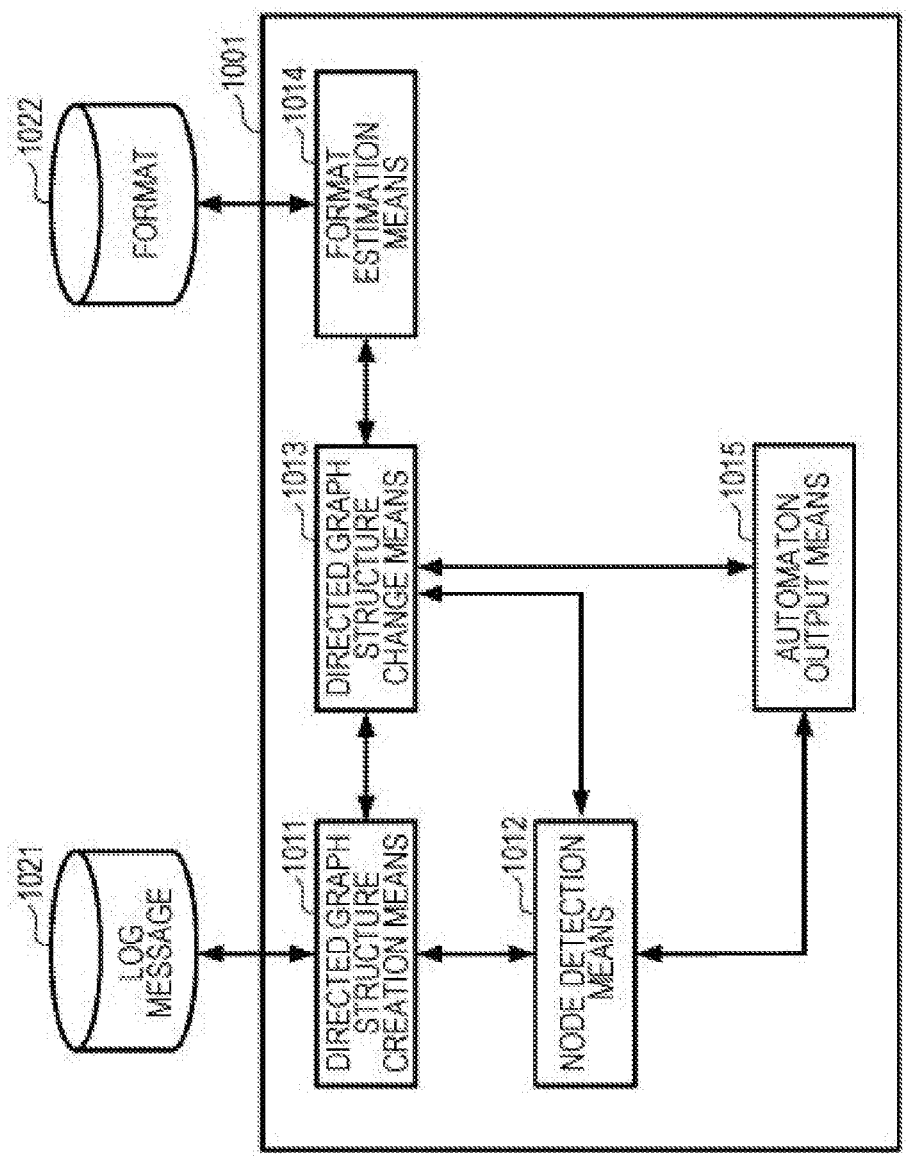
FIG. 10 is a diagram illustrating an example of a functional block of a computer which preferably includes the hardware configuration according to FIG. 1 and which implements an embodiment of the present invention in accordance with the flowcharts illustrated in FIGS. 9A to 9C.

FIG. 10 is a diagram illustrating an example of a functional block diagram of a computer which preferably has the hardware configuration according to FIG. 1 and which implements an embodiment of the present invention in accordance with the flowcharts illustrated in FIGS. 9A to 9C.

A computer (1001) includes the configuration of the computer (101) illustrated in FIG. 1, such as the CPU (102), the main memory (103), the storage device (108), and the disk (109).

The computer (1001) includes directed graph structure creation means (1011), node detection means (1012), directed graph structure change means (1013), and format estimation means (1014). Optionally, the computer (1001) further includes automaton output means (1015).

The directed graph structure creation means (1011) creates a first directed graph structure by dividing a first log message by predetermined characters to define divided portions as nodes and arranging the nodes in order from the beginning of the first log message, and creates a second directed graph structure by dividing a second log message by the predetermined characters to define divided portions as nodes and arranging the nodes in order from the beginning of the second log message.

The directed graph structure creation means (1011) also creates a third directed graph structure by dividing a third log message by the predetermined characters to define divided portions as nodes and arranging the nodes in order from the beginning of the third log message.

The directed graph structure creation means (1011) performs steps 902 to 907 described in FIG. 9A and the individual steps descried in FIGS. 9B and 9C.

The node detection means (1012) compares nodes in the first directed graph structure with nodes in the second directed graph structure to detect a node in the first directed graph structure and a node in the second directed graph structure that include a node other than those including a corresponding character string.

In the case where a plurality of closed paths are formed, the node detection means (1012) also recursively determines, from a smaller closed path of the plurality of closed paths, that the appearance tendencies of character strings are similar to each other.

In the case where a node in the first directed graph structure and a node in the second directed graph structure that include a different character string are found, the node detection means (1012) also searches for a subgraph and a path including the largest number of partially corresponding nodes in the found nodes.

The node detection means (1012) also performs the search using a memorizing recursion technique.

The node detection means (1012) performs steps 909 to 911 described in FIG. 9A.

The directed graph structure change means (1013) adds to the first directed graph structure the node detected in the second directed graph structure among the detected nodes as a first branch node.

The directed graph structure change means (1013) also integrates the nodes having similar appearance tendencies of character strings into one node in the first directed graph structure including the first branch node added thereto.

The directed graph structure change means (1013) performs step 908 described in FIG. 9A.

The format estimation means (1014) estimates the format, based on the first directed graph structure including the first branch node added thereto. The format includes a first portion associated with a node including a corresponding character string, a second portion associated with a node whose appearance tendency of character string is similar between the node detected in the first directed graph structure and the node detected in the second directed graph structure, and, optionally, a third portion associated with a node other than those having a similar appearance tendency of character string.

The format estimation means (1014) also estimates the format, by scanning at least a path passing from an origin node to a terminal node of the first directed graph structure including the first branch node added thereto.

The node detection means (1014) performs steps 912 and 913 described in FIG. 9A.

The automaton output means (1015) outputs the first directed graph structure in which the nodes having similar appearance tendencies of character strings are integrated into one node as an automaton.

What is claimed is:

1. A computer for estimating a format of a log message, the computer comprising:
   one or more hardware processors;
   directed graph structure creation means for creating a first directed graph structure by dividing a first log message by predetermined characters to define divided portions as nodes and arranging the nodes in order from the beginning of the first log message, and creating a second directed graph structure by dividing the second log message by the predetermined characters to define divided portions as nodes and arranging the nodes in order from the beginning of the second log message;
   node detection means for comparing nodes in the first directed graph structure with nodes in the second directed graph structure to detect a node in the first directed graph structure and a node in the second directed graph structure that are nodes other than nodes including a corresponding character string;
   directed graph structure change means for adding to the first directed graph structure the node detected in the second directed graph structure among the detected nodes as a first branch node; and
   format estimation means for estimating the format, based on the first directed graph structure including the first branch node added thereto, wherein the format includes a first portion associated with a node including a corresponding character string, a second portion associated with a node whose appearance tendency of character string is similar between the node detected in the first directed graph structure and the node detected in the second directed graph structure, and a third portion associated with a node other than nodes having a similar appearance tendency of character string.

2. The computer of claim 1, wherein the creating the second directed graph structure, the detecting, and the adding are repeated.

3. The computer of claim 1, wherein the estimating is performed based on the directed graph structure created in the adding after repeating a predetermined number of times.

4. The computer of claim 1, further comprising:
   a means for integrating the nodes having similar appearance tendencies of character strings into one node in the first directed graph structure including the first branch node added thereto,
   wherein the estimating is performed based on the first directed graph structure in which the nodes having similar appearance tendencies of character strings are integrated into one node.

5. The computer of claim 4, wherein a determination of the appearance tendencies of character strings are similar to each other is performed on the basis of:
   a first condition that a percentage of character strings having similar character types is equal to or more than a predetermined value,
   a second condition that a character length is equal to or more than a predetermined value,
   a third condition that an editing distance between characters is short, or
   a fourth condition that at least two of the first to third conditions are satisfied.

6. The computer of claim 4, wherein the creating the second directed graph structure, the detecting, the adding, and the integrating are repeated.

7. The computer of claim 6, wherein the estimating is performed based on the directed graph structure created in the integrating performed after repeating a predetermined number of times.

8. The computer of claim 4, wherein the first directed graph structure including the first branch node added thereto has a closed path including two nodes including a corresponding character string, at least one node detected in the first directed graph structure, and at least one node detected in the second directed graph structure, and the at least one node detected in the first directed graph structure and the at least one node detected in the second directed graph structure exist between the two nodes including the corresponding character string.

9. The computer of claim 8, wherein in case that the closed path includes a plurality of closed paths, the detecting further includes a determining step of recursively determining, from a smaller closed path of the plurality of closed paths, that the appearance tendencies of character strings are similar to each other.

10. The computer of claim 4, further comprising:
a means for outputting the first directed graph structure in which the nodes having similar appearance tendencies of character strings are integrated into one node as an automaton.

11. The computer of claim 10, further comprising:
a means for creating a third directed graph structure by dividing a third log message by the predetermined characters to define divided portions as nodes and arranging the nodes in order from the beginning of the third log message;
a means for determining whether a node in the third directed graph structure corresponds to a node in the automaton;
a means for comparing, in accordance with a node in the third directed graph structure being different from a node in the automaton, nodes in the first directed graph structure including the first branch node added thereto with nodes in the third directed graph structure to detect a node in the first directed graph structure including the first branch node added thereto and a node in the third directed graph structure that are nodes other than nodes including a corresponding character string; and
a means for adding to the first directed graph structure including the first branch node added thereto the node detected in the third directed graph structure among the detected nodes as a second branch node, wherein the estimating is performed based on the first directed graph structure including the second branch node added thereto.

12. The computer of claim 11, wherein the determining whether the node in the third directed graph structure corresponds to the node in the automaton includes:
determining, in accordance with at least one node in the third directed graph structure satisfying a predetermined condition with respect to the integrated node in the automaton, that the node in the third directed graph structure corresponds to the node in the automaton.

13. The computer of claim 1, wherein the detecting includes:
searching for, in case that a node in the first directed graph structure and a node in the second directed graph structure that include a different character string are found, a subgraph and a path including the largest number of partially corresponding nodes in the found nodes.

14. The computer of claim 13, wherein the searching is performed using a memorizing recursion technique.

15. The computer of claim 1, wherein the estimating includes:
estimating the format, by scanning at least a path passing from an origin node to a terminal node of the first directed graph structure including the first branch node added thereto.

16. The computer of claim 15, wherein in case that the path includes a plurality of paths, the format includes the first portion, the second portion, and the third portion, which are associated with nodes in the plurality of paths.

17. The computer of claim 1, wherein the predetermined characters are signs or blank characters.

18. The computer of claim 1, wherein the second portion is a sign representing an arbitrary character string.

* * * * *